United States Patent
Petite

(10) Patent No.: US 7,697,492 B2
(45) Date of Patent: *Apr. 13, 2010

(54) SYSTEMS AND METHODS FOR MONITORING AND CONTROLLING REMOTE DEVICES

(75) Inventor: Thomas David Petite, Douglasville, GA (US)

(73) Assignee: Sipco, LLC, Atlanta, GA (US)

( * ) Notice: Subject to any disclaimer, the term of this patent is extended or adjusted under 35 U.S.C. 154(b) by 975 days.

This patent is subject to a terminal disclaimer.

(21) Appl. No.: 11/159,768

(22) Filed: Jun. 23, 2005

(65) Prior Publication Data

US 2005/0243867 A1 Nov. 3, 2005

Related U.S. Application Data

(63) Continuation of application No. 09/812,044, filed on Mar. 19, 2001, now Pat. No. 6,914,893, which is a continuation-in-part of application No. 09/704,150, filed on Nov. 1, 2000, now Pat. No. 6,891,838, and a continuation-in-part of application No. 09/439,059, filed on Nov. 12, 1999, now Pat. No. 6,437,692, and a continuation-in-part of application No. 09/412,895, filed on Oct. 5, 1999, now Pat. No. 6,218,953, and a continuation-in-part of application No. 09/271,517, filed on Mar. 18, 1999, now abandoned, and a continuation-in-part of application No. 09/172,554, filed on Oct. 14, 1998, now Pat. No. 6,028,522, and a continuation-in-part of application No. 09/102,178, filed on Jun. 22, 1998, now Pat. No. 6,430,268.

(60) Provisional application No. 60/224,043, filed on Aug. 9, 2000.

(51) Int. Cl.
*H04W 4/00* (2009.01)

(52) U.S. Cl. .................. 370/338; 370/401; 340/870.02

(58) Field of Classification Search ....................... None
See application file for complete search history.

(56) References Cited

U.S. PATENT DOCUMENTS 3,665,475 A 5/1972 Gram (Continued)

FOREIGN PATENT DOCUMENTS

EP 0718954 6/1996

(Continued)

OTHER PUBLICATIONS

Khan, Robert E., "The Organization of Computer Resources into a Packet Radio Network," IEEE Transactions on Communications, Jan. 1977, vol. Com-25 No. 1, pp. 169-178.
Westcott, Jill A., "Issues in Distributed Routing for Mobile Packet Radio Network," IEEE 1982, pp. 233-238.
Brownrigg, E.B. et al.; A Packet Radio Network for Library Automation; IEEE (1987); pp. 456-462.
Brownrigg, E.B. et al.; A Packet Radio Networks; Architectures, Protocols, Technologies and Applications (1987), (introduction pp. ix-xviii); pp. 3-274.

(Continued)

*Primary Examiner*—Phirin Sam
(74) *Attorney, Agent, or Firm*—Troutman Sanders LLP; James H. Yancey, Jr.; Filip A. Kowalewski

(57) ABSTRACT

Systems and methods for monitoring and controlling remote devices are provided. In an embodiment, a system can comprise one or more remotely controlled sensors and actuators. The remote sensors/actuators can interface with uniquely identified remote transceivers that transmit and/or receive data. The embodiment can also comprise a plurality of transceivers each having a unique address, and a controller adapted to communicate with at least one of the transceivers in a preformatted message. A sensor can be associated with at least one transceiver to detect a condition and output a data signal to the transceiver, and an actuator can be associated with a transceiver to receive a control signal and activate a device. Other embodiments are also claimed and described.

25 Claims, 9 Drawing Sheets

U.S. PATENT DOCUMENTS

| | | | |
|---|---|---|---|
| 3,705,385 A | 12/1972 | Batz | |
| 3,723,876 A | 3/1973 | Seaborn, Jr. | |
| 3,742,142 A | 6/1973 | Martin | |
| 3,848,231 A | 11/1974 | Wooten | |
| 3,892,948 A | 7/1975 | Constable | |
| 3,906,460 A | 9/1975 | Halpern | |
| 3,914,692 A | 10/1975 | Seaborn, Jr. | |
| 3,922,492 A | 11/1975 | Lumsden | |
| 3,925,763 A | 12/1975 | Wadwhani et al. | |
| 4,025,315 A | 5/1977 | Mazelli | |
| 4,056,684 A | 11/1977 | Lindstrom | |
| 4,058,672 A | 11/1977 | Crager et al. | |
| 4,083,003 A | 4/1978 | Haemmig | |
| 4,120,452 A | 10/1978 | Kimura et al. | |
| 4,124,839 A | 11/1978 | Cohen | |
| 4,135,181 A | 1/1979 | Bogacki et al. | |
| 4,204,195 A | 5/1980 | Bogacki | |
| 4,213,119 A | 7/1980 | Ward et al. | |
| 4,277,837 A | 7/1981 | Stuckert | |
| 4,278,975 A | 7/1981 | Kimura et al. | |
| 4,322,842 A * | 3/1982 | Martinez | 370/204 |
| 4,354,181 A | 10/1982 | Spletzer | |
| 4,396,910 A | 8/1983 | Enemark et al. | |
| 4,396,915 A | 8/1983 | Farnsworth et al. | |
| 4,417,450 A | 11/1983 | Morgan, Jr. et al. | |
| 4,436,957 A | 3/1984 | Mazza | |
| 4,446,454 A | 5/1984 | Pyle | |
| 4,446,458 A | 5/1984 | Cook | |
| 4,454,414 A | 6/1984 | Benton | |
| 4,468,656 A | 8/1984 | Clifford et al. | |
| 4,488,152 A | 12/1984 | Arnason et al. | |
| 4,495,496 A | 1/1985 | Miller, III | |
| 4,551,719 A | 11/1985 | Carlin et al. | |
| 4,611,198 A | 9/1986 | Levinson et al. | |
| 4,621,263 A | 11/1986 | Takenaka et al. | |
| 4,630,035 A | 12/1986 | Stahl et al. | |
| 4,631,357 A | 12/1986 | Grunig | |
| 4,670,739 A | 6/1987 | Kelly, Jr. | |
| 4,692,761 A | 9/1987 | Robinton | |
| 4,707,852 A | 11/1987 | Jahr et al. | |
| 4,731,810 A | 3/1988 | Watkins | |
| 4,742,296 A | 5/1988 | Petr et al. | |
| 4,757,185 A | 7/1988 | Onishi | |
| 4,788,721 A | 11/1988 | Krishnan et al. | |
| 4,800,543 A | 1/1989 | Lyndon-James et al. | |
| 4,825,457 A | 4/1989 | Lebowitz | |
| 4,829,561 A | 5/1989 | Matheny | |
| 4,849,815 A | 7/1989 | Streck | |
| 4,851,654 A | 7/1989 | Nitta | |
| 4,856,046 A | 8/1989 | Steck et al. | |
| 4,857,912 A | 8/1989 | Everett, Jr. et al. | |
| 4,875,231 A | 10/1989 | Hara et al. | |
| 4,884,123 A | 11/1989 | Morris et al. | |
| 4,897,644 A | 1/1990 | Hirano | |
| 4,906,828 A | 3/1990 | Halpern | |
| 4,908,769 A | 3/1990 | Vaughan et al. | |
| 4,918,690 A | 4/1990 | Markkula, Jr. et al. | |
| 4,918,995 A | 4/1990 | Pearman et al. | |
| 4,928,299 A | 5/1990 | Tansky et al. | |
| 4,939,726 A | 7/1990 | Flammer et al. | |
| 4,940,976 A | 7/1990 | Gastouniotis et al. | |
| 4,949,077 A | 8/1990 | Mbuthia | |
| 4,952,928 A | 8/1990 | Carroll et al. | |
| 4,962,496 A | 10/1990 | Vercellotti et al. | |
| 4,967,366 A | 10/1990 | Kaehler | |
| 4,968,970 A | 11/1990 | LaPorte | |
| 4,968,978 A | 11/1990 | Stolarczyk | |
| 4,972,504 A | 11/1990 | Daniel, Jr. et al. | |
| 4,973,957 A | 11/1990 | Shimizu et al. | |
| 4,973,970 A | 11/1990 | Reeser | |
| 4,977,612 A | 12/1990 | Wilson | |
| 4,980,907 A | 12/1990 | Raith et al. | |
| 4,989,230 A | 1/1991 | Gillig et al. | |
| 4,991,008 A | 2/1991 | Nama | |
| 4,993,059 A | 2/1991 | Smith et al. | |
| 4,998,095 A | 3/1991 | Shields | |
| 4,999,607 A | 3/1991 | Evans | |
| 5,007,052 A | 4/1991 | Flammer | |
| 5,032,833 A | 7/1991 | Laporte | |
| 5,038,372 A | 8/1991 | Elms et al. | |
| 5,055,851 A | 10/1991 | Sheffer | |
| 5,057,814 A | 10/1991 | Onan et al. | |
| 5,061,997 A | 10/1991 | Rea et al. | |
| 5,079,768 A | 1/1992 | Flammer | |
| 5,086,391 A | 2/1992 | Chambers | |
| 5,091,713 A | 2/1992 | Horne et al. | |
| 5,111,199 A | 5/1992 | Tomoda et al. | |
| 5,113,183 A | 5/1992 | Mizuno et al. | |
| 5,113,184 A | 5/1992 | Katayama | |
| 5,115,224 A | 5/1992 | Kostusiak et al. | |
| 5,115,433 A | 5/1992 | Baran et al. | |
| 5,124,624 A | 6/1992 | de Vries et al. | |
| 5,128,855 A | 7/1992 | Hilber et al. | |
| 5,130,519 A | 7/1992 | Bush et al. | |
| 5,130,987 A | 7/1992 | Flammer | |
| 5,131,038 A | 7/1992 | Puhl et al. | |
| 5,134,650 A | 7/1992 | Blackmon | |
| 5,136,285 A | 8/1992 | Okuyama | |
| 5,155,481 A | 10/1992 | Brennan, Jr. et al. | |
| 5,159,317 A | 10/1992 | Brav | |
| 5,162,776 A | 11/1992 | Bushnell et al. | |
| 5,177,342 A | 1/1993 | Adams | |
| 5,189,287 A | 2/1993 | Parienti | |
| 5,191,192 A | 3/1993 | Takahira et al. | |
| 5,191,326 A | 3/1993 | Montgomery | |
| 5,193,111 A | 3/1993 | Matty et al. | |
| 5,195,018 A | 3/1993 | Kwon et al. | |
| 5,197,095 A | 3/1993 | Bonnet et al. | |
| 5,200,735 A | 4/1993 | Hines | |
| 5,204,670 A | 4/1993 | Stinton | |
| 5,212,645 A | 5/1993 | Wildes et al. | |
| 5,216,502 A | 6/1993 | Katz | |
| 5,221,838 A | 6/1993 | Gutman et al. | |
| 5,223,844 A | 6/1993 | Mansell et al. | |
| 5,231,658 A | 7/1993 | Eftechiou | |
| 5,235,630 A | 8/1993 | Moody et al. | |
| 5,239,294 A | 8/1993 | Flanders et al. | |
| 5,239,575 A | 8/1993 | White et al. | |
| 5,241,410 A | 8/1993 | Streck et al. | |
| 5,243,338 A | 9/1993 | Brennan, Jr. et al. | |
| 5,245,633 A | 9/1993 | Schwartz et al. | |
| 5,251,205 A | 10/1993 | Callon et al. | |
| 5,252,967 A | 10/1993 | Brennan et al. | |
| 5,253,167 A | 10/1993 | Yoshida et al. | |
| 5,265,150 A | 11/1993 | Helmkamp et al. | |
| 5,265,162 A | 11/1993 | Bush et al. | |
| 5,266,782 A | 11/1993 | Alanara et al. | |
| 5,272,747 A | 12/1993 | Meads | |
| 5,282,204 A | 1/1994 | Shpancer et al. | |
| 5,282,250 A | 1/1994 | Dent et al. | |
| 5,289,165 A | 2/1994 | Belin | |
| 5,291,516 A | 3/1994 | Dixon et al. | |
| 5,295,154 A | 3/1994 | Meier et al. | |
| 5,305,370 A | 4/1994 | Kearns et al. | |
| 5,309,501 A | 5/1994 | Kozik et al. | |
| 5,315,645 A | 5/1994 | Matheny | |
| 5,317,309 A | 5/1994 | Vercellotti et al. | |
| 5,319,364 A | 6/1994 | Waraksa et al. | |
| 5,319,698 A | 6/1994 | Glidwell et al. | |
| 5,319,711 A | 6/1994 | Servi | |
| 5,323,384 A | 6/1994 | Norwood et al. | |
| 5,325,429 A | 6/1994 | Kurgan | |
| 5,329,394 A | 7/1994 | Calvani et al. | |
| 5,331,318 A | 7/1994 | Montgomery | |

| | | | | | |
|---|---|---|---|---|---|
| 5,334,974 A | 8/1994 | Simms et al. | 5,574,111 A | 11/1996 | Brichta et al. |
| 5,335,265 A | 8/1994 | Cooper et al. | 5,583,850 A | 12/1996 | Snodgrass et al. |
| 5,343,493 A | 8/1994 | Karimullah | 5,587,705 A | 12/1996 | Morris |
| 5,345,231 A | 9/1994 | Koo et al. | 5,589,878 A | 12/1996 | Cortjens et al. |
| 5,345,595 A | 9/1994 | Johnson et al. | 5,590,038 A | 12/1996 | Pitroda |
| 5,347,263 A | 9/1994 | Carroll et al. | 5,590,179 A | 12/1996 | Shincovich et al. |
| 5,354,974 A | 10/1994 | Eisenberg | 5,592,491 A | 1/1997 | Dinkins |
| 5,355,278 A | 10/1994 | Hosoi et al. | 5,594,431 A | 1/1997 | Sheppard et al. |
| 5,355,513 A | 10/1994 | Clarke et al. | 5,596,719 A | 1/1997 | Ramakrishnan et al. |
| 5,365,217 A | 11/1994 | Toner | 5,602,843 A | 2/1997 | Gray |
| 5,371,736 A | 12/1994 | Evan | 5,604,414 A | 2/1997 | Milligan et al. |
| 5,382,778 A | 1/1995 | Takahira et al. | 5,604,869 A | 2/1997 | Mincher et al. |
| 5,383,134 A | 1/1995 | Wrzesinski | 5,606,361 A | 2/1997 | Davidsohn et al. |
| 5,390,206 A | 2/1995 | Rein | 5,608,786 A | 3/1997 | Gordon |
| 5,406,619 A | 4/1995 | Akhteruzzman et al. | 5,613,620 A | 3/1997 | Center et al. |
| 5,412,192 A | 5/1995 | Hoss | 5,615,277 A | 3/1997 | Hoffman |
| 5,412,760 A | 5/1995 | Peitz | 5,619,192 A | 4/1997 | Ayala |
| 5,416,475 A | 5/1995 | Tolbert et al. | 5,625,410 A | 4/1997 | Washino et al. |
| 5,416,725 A | 5/1995 | Pacheco et al. | 5,628,050 A | 5/1997 | McGraw et al. |
| 5,418,812 A | 5/1995 | Reyes et al. | 5,629,687 A | 5/1997 | Sutton et al. |
| 5,420,910 A | 5/1995 | Rudokas et al. | 5,629,875 A | 5/1997 | Adair, Jr. |
| 5,424,708 A | 6/1995 | Ballestry et al. | 5,630,209 A | 5/1997 | Wizgall et al. |
| 5,432,507 A | 7/1995 | Mussino et al. | 5,631,554 A | 5/1997 | Briese et al. |
| 5,438,329 A | 8/1995 | Gastouniotis et al. | 5,636,216 A | 6/1997 | Fox et al. |
| 5,439,414 A | 8/1995 | Jacob | 5,640,002 A | 6/1997 | Ruppert et al. |
| 5,440,545 A | 8/1995 | Buchholz et al. | 5,644,294 A | 7/1997 | Ness |
| 5,442,553 A | 8/1995 | Parrillo | 5,655,219 A | 8/1997 | Jusa et al. |
| 5,445,287 A | 8/1995 | Center et al. | 5,657,389 A | 8/1997 | Houvener |
| 5,445,347 A | 8/1995 | Ng | 5,659,300 A | 8/1997 | Dresselhuys et al. |
| 5,451,929 A | 9/1995 | Adelman et al. | 5,659,303 A | 8/1997 | Adair, Jr. |
| 5,451,938 A | 9/1995 | Brennan, Jr. | 5,668,876 A | 9/1997 | Falk et al. |
| 5,452,344 A | 9/1995 | Larson | 5,673,252 A | 9/1997 | Johnson et al. |
| 5,454,024 A | 9/1995 | Lebowitz | 5,673,304 A | 9/1997 | Connor et al. |
| 5,465,401 A | 11/1995 | Thompson | 5,673,305 A | 9/1997 | Ross |
| 5,467,074 A | 11/1995 | Pedtke | 5,682,139 A | 10/1997 | Pradeep et al. |
| 5,467,082 A | 11/1995 | Sanderson | 5,682,476 A | 10/1997 | Tapperson et al. |
| 5,467,345 A | 11/1995 | Cutler, Jr. et al. | 5,689,229 A | 11/1997 | Chaco et al. |
| 5,468,948 A | 11/1995 | Koenck et al. | 5,699,328 A | 12/1997 | Ishizaki et al. |
| 5,471,201 A | 11/1995 | Cerami et al. | 5,701,002 A | 12/1997 | Oishi et al. |
| 5,473,322 A | 12/1995 | Carney | 5,702,059 A | 12/1997 | Chu et al. |
| 5,475,689 A | 12/1995 | Kay et al. | 5,704,046 A | 12/1997 | Hogan |
| 5,481,259 A | 1/1996 | Bane | 5,704,517 A | 1/1998 | Lancaster, Jr. |
| 5,481,532 A | 1/1996 | Hassan et al. | 5,706,191 A | 1/1998 | Bassett et al. |
| 5,484,997 A | 1/1996 | Haynes | 5,706,976 A | 1/1998 | Purkey |
| 5,488,608 A | 1/1996 | Flammer, III | 5,708,223 A | 1/1998 | Wyss |
| 5,493,273 A | 2/1996 | Smurlo et al. | 5,708,655 A | 1/1998 | Toth et al. |
| 5,493,287 A | 2/1996 | Bane | 5,712,619 A | 1/1998 | Simkin |
| 5,502,726 A | 3/1996 | Fischer | 5,712,980 A | 1/1998 | Beeler et al. |
| 5,506,837 A | 4/1996 | Sollner et al. | 5,714,931 A | 2/1998 | Petite et al. |
| 5,509,073 A | 4/1996 | Monnin | 5,717,718 A | 2/1998 | Roswell et al. |
| 5,513,244 A | 4/1996 | Joao et al. | 5,719,564 A * | 2/1998 | Sears .................... 340/870.02 |
| 5,515,419 A | 5/1996 | Sheffer | 5,726,634 A | 3/1998 | Hess et al. |
| 5,517,188 A | 5/1996 | Caroll et al. | 5,726,984 A | 3/1998 | Kubler et al. |
| 5,522,089 A | 5/1996 | Kikinis et al. | 5,732,074 A | 3/1998 | Spaur et al. |
| 5,528,215 A | 6/1996 | Siu et al. | 5,732,078 A | 3/1998 | Arango |
| 5,539,825 A | 7/1996 | Akiyama et al. | 5,736,965 A | 4/1998 | Mosebrook et al. |
| 5,541,938 A | 7/1996 | Di Zenzo et al. | 5,740,232 A | 4/1998 | Pailles et al. |
| 5,542,100 A | 7/1996 | Hatakeyama | 5,742,509 A | 4/1998 | Goldberg et al. |
| 5,544,036 A | 8/1996 | Brown, Jr. et al. | 5,745,849 A | 4/1998 | Britton |
| 5,544,784 A | 8/1996 | Malaspina | 5,748,104 A | 5/1998 | Argyroudis et al. |
| 5,548,632 A | 8/1996 | Walsh et al. | 5,748,619 A | 5/1998 | Meier |
| 5,550,358 A | 8/1996 | Tait et al. | 5,754,111 A | 5/1998 | Garcia |
| 5,550,359 A | 8/1996 | Bennett | 5,754,227 A | 5/1998 | Fukuoka |
| 5,550,535 A | 8/1996 | Park | 5,757,783 A | 5/1998 | Eng et al. |
| 5,553,094 A | 9/1996 | Johnson et al. | 5,757,788 A | 5/1998 | Tatsumi et al. |
| 5,555,258 A | 9/1996 | Snelling et al. | 5,761,083 A | 6/1998 | Brown, Jr. et al. |
| 5,555,286 A | 9/1996 | Tendler | 5,764,742 A | 6/1998 | Howard et al. |
| 5,562,537 A | 10/1996 | Zver et al. | 5,767,791 A | 6/1998 | Stoop et al. |
| 5,565,857 A | 10/1996 | Lee | 5,771,274 A | 6/1998 | Harris |
| 5,568,535 A | 10/1996 | Sheffer et al. | 5,774,052 A | 6/1998 | Hamm et al. |
| 5,570,084 A | 10/1996 | Ritter et al. | 5,781,143 A | 7/1998 | Rossin |
| 5,572,438 A | 11/1996 | Ehlers et al. | 5,790,644 A | 8/1998 | Kikinis |
| 5,573,181 A | 11/1996 | Ahmed | 5,790,662 A | 8/1998 | Valerij et al. |

| | | | | | | |
|---|---|---|---|---|---|---|
| 5,790,938 A | 8/1998 | Talarmo | | 5,991,639 A | 11/1999 | Rautiola et al. |
| 5,796,727 A | 8/1998 | Harrison et al. | | 5,994,892 A | 11/1999 | Turino et al. |
| 5,798,964 A | 8/1998 | Shimizu et al. | | 5,995,592 A | 11/1999 | Shirai et al. |
| 5,801,643 A | 9/1998 | Williams et al. | | 5,995,593 A | 11/1999 | Cho |
| 5,815,505 A | 9/1998 | Mills | | 5,997,170 A | 12/1999 | Brodbeck |
| 5,818,822 A | 10/1998 | Thomas et al. | | 5,999,094 A | 12/1999 | Nilssen |
| 5,822,273 A | 10/1998 | Bary et al. | | 6,005,759 A | 12/1999 | Hart et al. |
| 5,822,544 A | 10/1998 | Chaco et al. | | 6,005,963 A | 12/1999 | Bolle et al. |
| 5,825,772 A | 10/1998 | Dobbins et al. | | 6,021,664 A | 2/2000 | Granato et al. |
| 5,826,195 A | 10/1998 | Westerlage et al. | | 6,023,223 A | 2/2000 | Baxter, Jr. |
| 5,828,044 A | 10/1998 | Jun et al. | | 6,026,095 A | 2/2000 | Sherer et al. |
| 5,832,057 A | 11/1998 | Furman | | 6,028,522 A | 2/2000 | Petite |
| 5,838,223 A | 11/1998 | Gallant et al. | | 6,028,857 A | 2/2000 | Poor |
| 5,838,237 A | 11/1998 | Revell et al. | | 6,031,455 A | 2/2000 | Grube et al. |
| 5,838,812 A | 11/1998 | Pare, Jr. et al. | | 6,032,197 A | 2/2000 | Birdwell et al. |
| 5,841,118 A | 11/1998 | East et al. | | 6,035,213 A | 3/2000 | Tokuda et al. |
| 5,841,764 A | 11/1998 | Roderique et al. | | 6,035,266 A | 3/2000 | Williams et al. |
| 5,842,976 A | 12/1998 | Williamson | | 6,036,086 A | 3/2000 | Sizer, II et al. |
| 5,844,808 A | 12/1998 | Konsmo et al. | | 6,038,491 A | 3/2000 | McGarry et al. |
| 5,845,230 A | 12/1998 | Lamberson | | 6,044,062 A | 3/2000 | Brownrigg et al. |
| 5,852,658 A | 12/1998 | Knight et al. | | 6,054,920 A | 4/2000 | Smith et al. |
| 5,854,994 A | 12/1998 | Canada et al. | | 6,060,994 A | 5/2000 | Chen |
| 5,862,201 A | 1/1999 | Sands | | 6,061,604 A | 5/2000 | Russ et al. |
| 5,864,772 A | 1/1999 | Alvarado et al. | | 6,064,318 A | 5/2000 | Kirchner, III et al. |
| 5,873,043 A | 2/1999 | Comer | | 6,067,017 A | 5/2000 | Stewart et al. |
| 5,874,903 A * | 2/1999 | Shuey et al. ............ 340/870.02 | | 6,067,030 A | 5/2000 | Burnett et al. |
| 5,880,677 A | 3/1999 | Lestician | | 6,069,886 A | 5/2000 | Ayerst et al. |
| 5,883,886 A * | 3/1999 | Eaton et al. ................ 370/314 | | 6,073,169 A | 6/2000 | Shuey et al. |
| 5,884,184 A | 3/1999 | Sheffer | | 6,073,266 A | 6/2000 | Ahmed et al. |
| 5,884,271 A | 3/1999 | Pitroda | | 6,073,840 A | 6/2000 | Marion |
| 5,886,333 A | 3/1999 | Miyake | | 6,075,451 A | 6/2000 | Lebowitz et al. |
| 5,889,468 A | 3/1999 | Banga | | 6,078,251 A | 6/2000 | Landt et al. |
| 5,892,690 A | 4/1999 | Boatman et al. | | 6,087,957 A | 7/2000 | Gray |
| 5,892,758 A | 4/1999 | Argyroudis | | 6,088,659 A | 7/2000 | Kelley et al. |
| 5,892,924 A | 4/1999 | Lyon et al. | | 6,094,622 A | 7/2000 | Hubbard et al. |
| 5,896,097 A | 4/1999 | Cardozo | | 6,100,817 A | 8/2000 | Mason, Jr. et al. |
| 5,897,607 A | 4/1999 | Jenney et al. | | 6,101,427 A | 8/2000 | Yang |
| 5,898,369 A | 4/1999 | Godwin | | 6,101,445 A | 8/2000 | Alvarado et al. |
| 5,905,438 A | 5/1999 | Weiss et al. | | 6,108,614 A * | 8/2000 | Lincoln et al. ............... 702/183 |
| 5,907,291 A | 5/1999 | Chen et al. | | 6,112,983 A | 9/2000 | D'Anniballe et al. |
| 5,907,491 A | 5/1999 | Canada et al. | | 6,115,580 A | 9/2000 | Chuprun et al. |
| 5,907,540 A | 5/1999 | Hayashi | | 6,119,076 A | 9/2000 | Williams et al. |
| 5,907,807 A | 5/1999 | Chavez, Jr. et al. | | 6,121,593 A | 9/2000 | Mansbery et al. |
| 5,914,672 A | 6/1999 | Glorioso et al. | | 6,121,885 A | 9/2000 | Masone et al. |
| 5,914,673 A | 6/1999 | Jennings et al. | | 6,124,806 A * | 9/2000 | Cunningham et al. .. 340/870.02 |
| 5,917,405 A | 6/1999 | Joao | | 6,127,917 A | 10/2000 | Tuttle |
| 5,917,629 A | 6/1999 | Hortensius et al. | | 6,128,551 A | 10/2000 | Davis et al. |
| 5,923,269 A * | 7/1999 | Shuey et al. ............ 340/870.02 | | 6,130,622 A | 10/2000 | Hussey et al. |
| 5,926,103 A | 7/1999 | Petite | | 6,133,850 A | 10/2000 | Moore |
| 5,926,529 A | 7/1999 | Hache et al. | | 6,137,423 A | 10/2000 | Glorioso et al. |
| 5,926,531 A | 7/1999 | Petite | | 6,140,975 A | 10/2000 | Cohen |
| 5,933,073 A | 8/1999 | Shuey | | 6,141,347 A | 10/2000 | Shaughnessy et al. |
| 5,941,363 A | 8/1999 | Partyka et al. | | 6,150,936 A | 11/2000 | Addy |
| 5,941,955 A | 8/1999 | Wilby et al. | | 6,150,955 A | 11/2000 | Tracy et al. |
| 5,948,040 A | 9/1999 | DeLorme et al. | | 6,157,464 A | 12/2000 | Bloomfield et al. |
| 5,949,779 A | 9/1999 | Mostafa et al. | | 6,157,824 A | 12/2000 | Bailey |
| 5,949,799 A | 9/1999 | Grivna et al. | | 6,163,276 A | 12/2000 | Irving et al. |
| 5,953,319 A | 9/1999 | Dutta et al. | | 6,172,616 B1 | 1/2001 | Johnson et al. |
| 5,953,371 A | 9/1999 | Roswell et al. | | 6,174,205 B1 | 1/2001 | Madsen et al. |
| 5,955,718 A | 9/1999 | Levasseur et al. | | 6,175,922 B1 | 1/2001 | Wang |
| 5,960,074 A | 9/1999 | Clark | | 6,177,883 B1 | 1/2001 | Jennetti et al. |
| 5,963,146 A | 10/1999 | Johnson et al. | | 6,181,255 B1 | 1/2001 | Crimmins et al. |
| 5,963,452 A | 10/1999 | Etoh et al. | | 6,181,284 B1 | 1/2001 | Madsen et al. |
| 5,963,650 A | 10/1999 | Simionescu et al. | | 6,181,981 B1 | 1/2001 | Varga et al. |
| 5,966,658 A | 10/1999 | Kennedy, III et al. | | 6,188,354 B1 | 2/2001 | Soliman et al. |
| 5,969,608 A | 10/1999 | Sojdehei et al. | | 6,192,390 B1 | 2/2001 | Berger et al. |
| 5,973,756 A | 10/1999 | Erlin | | 6,198,390 B1 | 3/2001 | Schlager et al. |
| 5,974,236 A | 10/1999 | Sherman | | 6,199,068 B1 | 3/2001 | Carpenter |
| 5,978,364 A | 11/1999 | Melnik | | 6,208,266 B1 | 3/2001 | Lyons et al. |
| 5,978,371 A | 11/1999 | Mason, Jr. et al. | | 6,215,404 B1 | 4/2001 | Morales |
| 5,986,574 A | 11/1999 | Colton | | 6,218,953 B1 | 4/2001 | Petite |
| 5,987,421 A | 11/1999 | Chuang | | 6,218,958 B1 | 4/2001 | Eichstaedt |
| 5,991,625 A | 11/1999 | Vanderpool | | 6,218,983 B1 | 4/2001 | Kerry et al. |

| | | | | | | |
|---|---|---|---|---|---|---|
| 6,219,409 B1 | 4/2001 | Smith et al. | 6,574,603 B1 | 6/2003 | Dickson et al. | |
| 6,229,439 B1 | 5/2001 | Tice | 6,584,080 B1 | 6/2003 | Ganz et al. | |
| 6,233,327 B1 | 5/2001 | Petite | 6,600,726 B1 | 7/2003 | Nevo et al. | |
| 6,234,111 B1 | 5/2001 | Ulman et al. | 6,608,551 B1 | 8/2003 | Anderson et al. | |
| 6,236,332 B1 | 5/2001 | Conkright et al. | 6,618,578 B1 | 9/2003 | Petite | |
| 6,243,010 B1 | 6/2001 | Addy et al. | 6,618,709 B1 | 9/2003 | Sneeringer | |
| 6,246,677 B1 | 6/2001 | Nap et al. | 6,628,764 B1 | 9/2003 | Petite | |
| 6,246,886 B1 | 6/2001 | Olivia | 6,628,965 B1 | 9/2003 | LaRosa et al. | |
| 6,249,516 B1 | 6/2001 | Brownrigg et al. | 6,653,945 B2 | 11/2003 | Johnson et al. | |
| 6,259,369 B1 | 7/2001 | Monico | 6,654,357 B1 | 11/2003 | Wiedeman | |
| 6,275,707 B1 | 8/2001 | Reed et al. | 6,671,586 B2 | 12/2003 | Davis et al. | |
| 6,286,756 B1 | 9/2001 | Stinson et al. | 6,674,403 B2 | 1/2004 | Gray et al. | |
| 6,288,634 B1 | 9/2001 | Weiss et al. | 6,678,255 B1 | 1/2004 | Kuriyan | |
| 6,288,641 B1 | 9/2001 | Carsais | 6,678,285 B1 | 1/2004 | Garg | |
| 6,295,291 B1 | 9/2001 | Larkins | 6,731,201 B1 | 5/2004 | Bailey et al. | |
| 6,301,514 B1 | 10/2001 | Canada et al. | 6,735,630 B1 | 5/2004 | Gelvin et al. | |
| 6,304,556 B1 | 10/2001 | Haas | 6,747,557 B1 | 6/2004 | Petite et al. | |
| 6,305,602 B1 | 10/2001 | Grabowski et al. | 6,771,981 B1 | 8/2004 | Zalewski et al. | |
| 6,308,111 B1 | 10/2001 | Koga | 6,804,532 B1 | 10/2004 | Moon et al. | |
| 6,311,167 B1 | 10/2001 | Davis et al. | 6,816,088 B1 | 11/2004 | Knoska et al. | |
| 6,314,169 B1 | 11/2001 | Schelberg, Jr. et al. | 6,888,876 B1 | 5/2005 | Mason, Jr. et al. | |
| 6,317,029 B1 | 11/2001 | Fleeter | 6,891,838 B1 | 5/2005 | Petite | |
| 6,334,117 B1 | 12/2001 | Covert et al. | 6,914,533 B2 | 7/2005 | Petite | |
| 6,351,223 B1 | 2/2002 | DeWeerd et al. | 6,914,893 B2 | 7/2005 | Petite | |
| 6,356,205 B1 | 3/2002 | Salvo et al. | 6,959,550 B2 | 11/2005 | Freeman et al. | |
| 6,357,034 B1 | 3/2002 | Muller et al. | 7,027,416 B1 | 4/2006 | Kriz | |
| 6,362,745 B1 | 3/2002 | Davis | 7,054,271 B2 | 5/2006 | Brownrigg et al. | |
| 6,363,057 B1 | 3/2002 | Ardalan et al. | 7,227,927 B1 * | 6/2007 | Benedyk et al. | 379/9.05 |
| 6,366,217 B1 | 4/2002 | Cunningham et al. | 2001/0002210 A1 | 5/2001 | Petite | |
| 6,366,622 B1 | 4/2002 | Brown et al. | 2001/0003479 A1 | 6/2001 | Fujiwara | |
| 6,369,769 B1 | 4/2002 | Nap et al. | 2001/0021646 A1 | 9/2001 | Antonucci et al. | |
| 6,370,489 B1 | 4/2002 | Williams et al. | 2001/0024163 A1 | 9/2001 | Petite | |
| 6,373,399 B1 | 4/2002 | Johnson et al. | 2001/0034223 A1 | 10/2001 | Rieser et al. | |
| 6,380,851 B1 | 4/2002 | Gilbert et al. | 2001/0038343 A1 | 11/2001 | Meyer et al. | |
| 6,384,722 B1 | 5/2002 | Williams | 2002/0002444 A1 | 1/2002 | Williams et al. | |
| 6,393,341 B1 | 5/2002 | Lawrence et al. | 2002/0013679 A1 | 1/2002 | Petite | |
| 6,393,381 B1 | 5/2002 | Williams et al. | 2002/1112323 | 1/2002 | Petite | |
| 6,393,382 B1 | 5/2002 | Williams et al. | 2002/0019725 A1 | 2/2002 | Petite | |
| 6,396,839 B1 | 5/2002 | Ardalan et al. | 2002/0027504 A1 | 3/2002 | Petite et al. | |
| 6,400,819 B1 | 6/2002 | Nakano et al. | 2002/0031101 A1 | 3/2002 | Petite | |
| 6,401,081 B1 | 6/2002 | Montgomery et al. | 2002/0032746 A1 | 3/2002 | Lazaridis | |
| 6,405,018 B1 | 6/2002 | Reudink et al. | 2002/0061031 A1 | 5/2002 | Sugar et al. | |
| 6,411,889 B1 | 6/2002 | Mizunuma et al. | 2002/0072348 A1 | 6/2002 | Wheeler et al. | |
| 6,415,245 B2 | 7/2002 | Williams et al. | 2002/0089428 A1 | 7/2002 | Walden et al. | |
| 6,421,354 B1 | 7/2002 | Godlewski | 2002/0095399 A1 | 7/2002 | Devine et al. | |
| 6,421,731 B1 | 7/2002 | Ciotti, Jr. et al. | 2002/0098858 A1 | 7/2002 | Struhsaker | |
| 6,422,464 B1 | 7/2002 | Terranova | 2002/0109607 A1 | 8/2002 | Cumeralto et al. | |
| 6,424,270 B1 | 7/2002 | Ali | 2002/0136233 A1 | 9/2002 | Chen et al. | |
| 6,424,931 B1 | 7/2002 | Sigmar et al. | 2002/0158774 A1 | 10/2002 | Johnson et al. | |
| 6,430,268 B1 | 8/2002 | Petite | 2002/0163442 A1 | 11/2002 | Fischer | |
| 6,431,439 B1 | 8/2002 | Suer et al. | 2002/0169643 A1 | 11/2002 | Petite | |
| 6,437,692 B1 | 8/2002 | Petite et al. | 2002/0193144 A1 | 12/2002 | Belski et al. | |
| 6,438,575 B1 | 8/2002 | Khan et al. | 2003/0001754 A1 | 1/2003 | Johnson et al. | |
| 6,445,291 B2 | 9/2002 | Addy et al. | 2003/0023146 A1 | 1/2003 | Shusterman | |
| 6,456,960 B1 | 9/2002 | Williams et al. | 2003/0028632 A1 | 2/2003 | Davis | |
| 6,457,038 B1 | 9/2002 | Defosse | 2003/0030926 A1 | 2/2003 | Aguren et al. | |
| 6,462,644 B1 | 10/2002 | Howell et al. | 2003/0034900 A1 | 2/2003 | Han | |
| 6,462,672 B1 | 10/2002 | Besson | 2003/0035438 A1 | 2/2003 | Larsson | |
| 6,477,558 B1 | 11/2002 | Irving et al. | 2003/0036822 A1 | 2/2003 | Davis et al. | |
| 6,483,290 B1 | 11/2002 | Hemminger et al. | 2003/0046377 A1 | 3/2003 | Daum et al. | |
| 6,484,939 B1 | 11/2002 | Blaeuer | 2003/0058818 A1 | 3/2003 | Wilkes et al. | |
| 6,489,884 B1 | 12/2002 | Lamberson et al. | 2003/0069002 A1 | 4/2003 | Hunter et al. | |
| 6,491,828 B1 | 12/2002 | Sivavec et al. | 2003/0073406 A1 | 4/2003 | Benjamin et al. | |
| 6,492,910 B1 | 12/2002 | Ragle et al. | 2003/0078029 A1 | 4/2003 | Petite | |
| 6,504,357 B1 | 1/2003 | Hemminger et al. | 2003/0093484 A1 | 5/2003 | Petite | |
| 6,507,794 B1 | 1/2003 | Hubbard et al. | 2003/0133473 A1 | 7/2003 | Manis et al. | |
| 6,509,722 B2 | 1/2003 | Lopata | 2003/0169710 A1 | 9/2003 | Fan et al. | |
| 6,519,568 B1 | 2/2003 | Harvey et al. | 2003/0185204 A1 | 10/2003 | Murdock | |
| 6,538,577 B1 | 3/2003 | Ehrke et al. | 2003/0210638 A1 | 11/2003 | Yoo | |
| 6,542,076 B1 | 4/2003 | Joao | 2004/0047324 A1 | 3/2004 | Diener | |
| 6,542,077 B2 | 4/2003 | Joao | 2004/0053639 A1 | 3/2004 | Petite | |
| 6,543,690 B2 | 4/2003 | Leydier et al. | 2004/0131125 A1 | 7/2004 | Sanderford, Jr. et al. | |
| 6,560,223 B1 | 5/2003 | Egan et al. | 2004/0133917 A1 | 7/2004 | Schilling | |

| | | | |
|---|---|---|---|
| 2004/0183687 | A1 | 9/2004 | Petite |
| 2004/0228330 | A1 | 11/2004 | Kubler et al. |
| 2005/0190055 | A1 | 9/2005 | Petite |
| 2005/0195768 | A1 | 9/2005 | Petite |
| 2005/0195775 | A1 | 9/2005 | Petite |
| 2005/0201397 | A1 | 9/2005 | Petite |
| 2006/0098576 | A1 | 5/2006 | Brownrigg et al. |
| 2008/0186898 | A1 | 7/2008 | Petite |
| 2009/0006617 | A1 | 1/2009 | Petite |
| 2009/0068947 | A1 | 12/2009 | Petite |

FOREIGN PATENT DOCUMENTS

| | | |
|---|---|---|
| EP | 07144 | 2/1998 |
| EP | 1096454 | 5/2001 |
| FR | 2817110 | 5/2002 |
| GB | 2229302 | 9/1990 |
| GB | 2247761 | 3/1992 |
| GB | 2262683 | 6/1993 |
| GB | 2297663 | 8/1996 |
| GB | 2310779 | 9/1997 |
| GB | 2326002 | 12/1998 |
| GB | 2336272 | 10/1999 |
| GB | 2352004 | 1/2001 |
| GB | 2352590 | 1/2001 |
| JP | 60261288 | 12/1985 |
| JP | 01255100 | 10/1989 |
| JP | 11353573 | 12/1999 |
| JP | 200113590 | 4/2000 |
| JP | 2001063425 | 3/2001 |
| JP | 2001088401 | 4/2001 |
| JP | 2001309069 | 11/2001 |
| JP | 2001319284 | 11/2001 |
| JP | 2001357483 | 12/2001 |
| JP | 2002007672 | 1/2002 |
| JP | 2002007826 | 1/2002 |
| JP | 2002085354 | 3/2002 |
| JP | 2002171354 | 6/2002 |
| KR | 2001025431 | 4/2001 |
| WO | WO 90/13197 | 11/1990 |
| WO | 9524177 | 9/1995 |
| WO | WO 98/00056 | 1/1998 |
| WO | WO98/10393 A1 | 3/1998 |
| WO | WO 98/37528 | 8/1998 |
| WO | WO 99/13426 | 3/1999 |
| WO | 0023956 | 4/2000 |
| WO | WO00/36812 A1 | 6/2000 |
| WO | WO 01/15114 | 3/2001 |
| WO | WO 01/24109 | 4/2001 |
| WO | WO 02/08725 | 1/2002 |
| WO | WO 02/08866 | 1/2002 |
| WO | WO 02/052521 | 7/2002 |
| WO | WO 03/007264 | 1/2003 |
| WO | WO 03/021877 | 3/2003 |
| WO | 04/002014 | 12/2003 |

OTHER PUBLICATIONS

Brownrigg, E.B. et al.; Distributions, Networks, and Networking: Options for Dissemination; Workshop on Electronic Texts Session III (http://palimpsest.standford.edu/byorg/Ic/etextw/sess3.html 1992): pp. 1-10.

Brownrigg, E.B. et al.; User Provided Access to the Internet; (http://web.simmons.edu/~chen/nit/NIT'92/033-bro.htm 2005) pp. 1-6.

Wey, Jyhi-Kong et al.; Clone Terminator: An Authentication Service for Advanced Mobile Phone System; IEEE (1995); pp. 175-179.

Davis, A.B. et al.; Knowledge-Based Management of Cellular Clone Fraud; IEEE (1992); pp. 230-234.

Johnson, David B.; Routing in Ad Hoc Networks of Mobile Hosts; IEEE (1995); pp. 158-163.

Jubin, John and Tornow, Janet D., "The Darpa Packet Radio Network Protocols,"Proceedings of the IEEE, vol. 75, No. 1, Jan. 1987, pp. 21-32.

Kleinrock, Leonard and Kamoun, Farouk, "Hierarchical Routing for Large Networks," North-Holland Publishing Company, Computer Networks 1, 1997, pp. 155-174.

Perkins, C.E. et al.; Highly Dynamic Destination-Sequenced Distance-Vector Routing (DSDV) for Mobile Computers; SIGCOMM 94-9/94 London England UK (1994); pp. 234-244.

Wu, J.; Distributed System Design; CRC Press (1999); pp. 177-180 and 204.

Khan, Robert E., Gronemeyer, Steven A. Burchfiel, Jerry, and Kunzelman, Ronald C., "Advances in Packet Radio Technology" IEEE Nov. 1978, vol. 66, No. 11, pp. 1468-149.

Westcott, Jil et al., "A Distributed Routing Design For A Broadcoast Environment", IEEE 1982, pp. 10.4.0-10.4.5.

Khan, Robert E. et al., "Advances in Packet Radio Technology", IEEE Nov. 1978, vol. 66, No. 11, pp. 1468-1496.

Frankel, Michael S., "Packet Radios Provide Link for Distributed, Survivable C3 in Post-Attack Scenarios", MSN Jun. 1983.

Lauer, Greg et al., "Survivable Protocols for Large Scale Packet Radio Networks", IEEE 1984, pp. 15.1-1 to 15.1-4.

Gower, Neil et al., "Congestion Control Using Pacing in a Packet Radio Network", IEEE 1982, pp. 23.1-1 to 23.1-6.

MacGregor, William et al., "Multiple Control Stations in Packet Radio Networks", IEEE 1982, pp. 10.3-1 to 10.3-5.

Shacham, Nachum et al., "Future Directions in Packet Radio Technology", IEEE 1985, pp. 93-98.

Jubin, John, "Current Packet Radio Network Protocols", IEEE 1985, pp. 86-92.

Westcott, Jill A., Issues in Distributed Routing for Mobile Packet Radio Network, IEEE 1982, pp. 233 238.

Lynch, Clifford A. et al., Packet Radio Networks, "Architectures, Protocols, Technologies and Applications,", 1987.

Brownrigg, Edwin, "User Provided Access to the Internet,", Open Access Solutions, http://web.simmons.edu/chen/nit/NIT'92/033-bro.htm, Jun. 8, 2005-Jun. 9, 2005.

K. Bult, et al.; "Low Power Systems for Wireless Microsensors;" UCLA Electrical Engineering Department, Los Angeles, CA and Rockwell Science Center, Thousand Oaks, CA; pp. 25-29.

David B. Johnson and David A. Maltz, Dynamic Source Routing in Ad Hoc Wireless Networks; Computer Science Department; Carnegie Mellon University; a chapter in Mobile Computing; Feb. 29, 1996; pp. 1-18.

David A. Maltz et al.; Experiences Designing and Building a Multi-Hop Wireless Ad Hoc Network Testbed; School of Computer Science, Carnegie Mellon University; Mar. 5, 1999; pp. 1-20.

"Part 11: Wireless LAN Medium Access Control (MAC) and Physical Layer (PHY) Specifications;" IEEE Std 802.11-1997; published Jun. 26, 1997 by the IEEE; pp. 1-459.

John Jubin and Janet D. Tornow; "The DARPA Packet Radio Network Protocols;" Proceedings of the IEEE; vol. 75, No. 1, Jan. 1987; pp. 64-79.

Chane Lee Fullmer; "Collision Avoidance Techniques for Packet-Radio Networks" thesis; University of California at Santa Cruz, CA; Jun. 1998; pp. 1-172.

Babak Daneshrad, et al.; 1997 Project Summary "Mobile Versatile Radios (MoVeR);" University of California, Los Angeles; pp. 1-4.

Rajeev Jain, et al.; 1997 Project Summary "Held Untethered Nodes;" University of California, Los Angeles; pp. 1-5.

Randy H. Katz and Eric A. Brewer; 1997 Project Summary "Towards a Wireless Overlay Internetworking Architecture;" University of California, Berkeley; pp. 1-8, including slide show presentation at http://daedalus.cs.berkeley.edu/talks/retreat.6.96/Overview.pdf.

J.J. Garcia-Luna-Aceves, et al.; "Wireless Internet Gateways (Wings);" IEEE, 1997; pp. 1271-1276.

Randy H. Katz, et al.; "The Bay Area Research Wireless Access Network (BARWAN);" Electrical Engineering and Computer Science Department, University of California, Berkeley, CA; IEEE, 1996; pp. 15-20, including slide show presentation at http://daedalus.cs.berkeley.edu/talks/retreat.6.97/BARWAN.S97.ppt.

USPTO's Decision dated Nov. 28, 2008 Denying Ex Parte Reexamination of USPN 7,103,511 in U.S. Appl. No. 90/010,315.

USPTO's Decision dated Jun. 22, 2009 Granting Ex Parte Reexamination of USPN 7,103,511 in U.S. Appl. No. 90/010,509.

USPTO's Decision dated Jun. 22, 2009 Granting Ex Parte Reexamination of USPN 7,103,511 in U.S. Appl. No. 90/010,505.
USPTO's Decision dated Jun. 22, 2009 Granting Ex Parte Reexamination of USPN 7,103,511 in U.S. Appl. No. 90/010,507.
USPTO's Decision dated Jun. 22, 2009 Granting Ex Parte Reexamination of USPN 7,103,511 in U.S. Appl. No. 90/010,508.
USPTO's Decision dated Jul. 21, 2009 Granting Ex Parte Reexamination of USPN 6,891,838 in U.S. Appl. No. 90/010,512.
USPTO's Decision dated Jul. 21, 2009 Granting Ex Parte Reexamination of USPN 6,891,838 in U.S. Appl. No. 90/010,510.
USPTO's Decision dated Jul. 21, 2009 Granting Ex Parte Reexamination of USPN 6,891,838 in U.S. Appl. No. 90/010,511.
USPTO's Decision dated Nov. 13, 2008 Granting Ex Parte Reexamination of USPN 6,891,838 in U.S. Appl. No. 90/010,301.

* cited by examiner

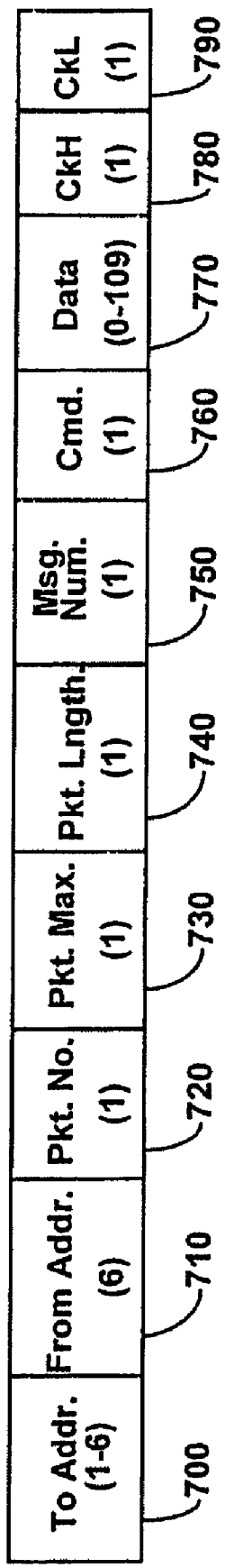
FIG. 7  Message Structure

FIG. 8

| "To Address" | Byte Assignment: |
|---|---|
| MSB - Byte 1<br>Device Type | FF-F0 (16) - Broadcast All Devices (1 Byte Address)<br>EF-1F (224) - Device Type Base (2 to 6 Byte Address)<br>0F-00 (16) - Personal Transceiver Identification (6 Byte Address) |
| Byte 2<br>Mfg./Owner ID | FF-F0 (16) - Broadcast all Devices (Byte 1 Type)<br>(2 Byte Broadcast Address)<br>EF-00 (240) - Mfg./Owner Code Identification Number |
| Byte 3<br>Mfg./Owner Extension ID | FF-F0 (16) - Broadcast all Devices (Byte 1 & Byte 2 Type)<br>(3 Byte Broadcast Address)<br>EF-00 (240) - Device Type/Mfg./Owner Code ID Number |
| Byte 4 | FF-F0 (16) - Broadcast all Devices (Byte 1 & Byte 2 Type)<br>(4 Byte Broadcast Address)<br>EF-00 (240) - ID Number |
| Byte 5 | (FF-00) 256 - Identification Number |
| Byte 6 | (FF-00) 256 - Identification Number |

Sample Messages

Central Server to Personal Transceiver - Broadcast Message - FF (Emergency)

Byte Count = 12 — 910

| To Addr. (FF) | From Addr. (12345678) | Pkt. No. (00) | Pkt. Max. (00) | Pkt. Lngth. (0C) | Cmd. (FF) | CkH (02) | CkL (9E) |
|---|---|---|---|---|---|---|---|

---

First Transceiver to Repeater (Transceiver)
Broadcast Message - FF (Emergency)

Byte Count = 17 — 920

| To Addr. (F0) | From Addr. (12345678) | Pkt. No. (00) | Pkt. Max. (00) | Pkt. Lngth. (11) | Cmd. (FF) | | CkH (03) | CkL (A0) |
|---|---|---|---|---|---|---|---|---|

Data (A000123456)

Note: Additional Transceiver Re-Broadcasts do not change the message. The messages are simply received and re-broadcast.

---

Message to Device "A0" From Device "E1" Command - "08" (Respond to PING)
Response will reverse "To" and "From" Addresses Byte Count = 17 — 930

| To Addr. (A012345678) | From Addr. (E112345678) | P # (00) | P Max. (00) | P Lngth. (11) | Cmd. (08) | Data (A5) | CkH (04) | CkL (67) |
|---|---|---|---|---|---|---|---|---|

FIG. 9

SYSTEMS AND METHODS FOR MONITORING AND CONTROLLING REMOTE DEVICES

CROSS-REFERENCE TO RELATED APPLICATIONS

This application is a continuation of U.S. patent application Ser. No. 09/812,044, filed Mar. 19, 2001, and entitled "System and Method for Monitoring and Controlling Remote Devices", now U.S. Pat. No. 6,914,893. U.S. patent application Ser. No. 09/812,044 is a continuation-in-part of: U.S. patent application Ser. No. 09/704,150, filed Nov. 1, 2000, and entitled "System and Method for Monitoring and Controlling Residential Devices", now U.S. Pat. No. 6,891,838; U.S. patent application Ser. No. 09/271,517, filed Mar. 18, 1999, and entitled, "System For Monitoring Conditions in a Residential Living Community", now abandoned; U.S. patent application Ser. No. 09/439,059, filed Nov. 12, 1999, and entitled, "System and Method for Monitoring and Controlling Remote Devices", now U.S. Pat. No. 6,437,692; U.S. patent application Ser. No. 09/102,178, filed Jun. 22, 1998, and entitled, "Multi-Function General Purpose Transceiver", now U.S. Pat. No. 6,430,268; U.S. patent application Ser. No. 09/172,554, filed Oct. 14, 1998, and entitled, "System for Monitoring the Light Level Around an ATM", now U.S. Pat. No. 6,028,522; and U.S. patent application Ser. No. 09/412,895, filed Oct. 5, 1999, and entitled, "System and Method for Monitoring the Light Level Around an ATM", now 6,218,953. U.S. patent application Ser. No. 09/812,044 also claims the benefit of U.S. Provisional Application Ser. No. 60/224,043, filed Aug. 9, 2000, and entitled "SOS OEA Packet Message Protocol (RF)". Each of the above-identified applications are hereby incorporated by reference in their entireties as if fully set forth below.

TECHNICAL FIELD

The present invention generally relates to remotely operated systems, and more particularly to a system for monitoring, controlling and, reporting on remote systems utilizing radio frequency (RF) transmissions.

BACKGROUND

There are a variety of systems for monitoring and controlling manufacturing processes, inventory systems, and emergency control systems. Most automatic systems use remote sensors and controllers to monitor and automatically respond to system parameters to reach desired results. A number of control systems utilize computers to process sensor outputs, model system responses, and control actuators that implement process corrections within the system. For example, the electric power generation and metallurgical processing industries successfully control production processes by utilizing computer control systems.

Many environmental and safety systems require real-time monitoring. Heating, ventilation, and air-conditioning systems (HVAC), fire reporting and suppression systems, alarm systems, and access control systems utilize real-time monitoring, and often require immediate feedback and control.

A problem with expanding the use of control system technology is the cost of the sensor/actuator infrastructure required to monitor and control such systems. The typical approach to implementing control system technology includes installing a local network of hard sensor(s)/actuator(s) and a local controller. There are expenses associated with developing and installing the appropriate sensor(s)/actuator(s) and connecting functional sensor(s)/actuator(s) with the local controller. Another prohibitive cost of control systems is the installation and operational expenses associated with the local controller.

FIG. 1 sets forth a block diagram illustrating certain fundamental components of a prior art control system 100. The prior art control system 100 includes a plurality of sensor/actuators 111, 112, 113, 114, 115, 116, and 117 electrically and physically coupled to a local controller 110. Local controller 110 provides power, formats and applies data signals from each of the sensors to predetermined process control functions, and returns control signals as appropriate to the actuators. Often, prior art control systems are further integrated via the public switched telephone network (PSTN) 120 to a central controller 130. Central controller 130 can also serve as a technician monitoring station and/or forward alarm conditions via PSTN 120 to appropriate officials.

Prior art control systems similar to that of FIG. 1 require the development and installation of an application-specific local system controller. In addition, each local system requires the direct coupling of electrical conductors to each sensor and actuator to the local system controller. Such prior art control systems are typically augmented with a central controller 130 that may be networked to the local controller 110 via PSTN 120. As a result, prior art control systems often are susceptible to a single point of failure if the local controller 110 goes out of service. Also, appropriately wiring an existing industrial plant can be dangerous and expensive.

BRIEF SUMMARY OF THE INVENTION

The embodiments of present invention are directed to a system and method of monitoring and controlling remote devices. More specifically, the present system is directed to a system for monitoring and controlling remote devices by transmitting data between the remote systems and a gateway interface via a packet message protocol system.

A preferred embodiment can comprise one or more remote sensors to be read and one or more actuators to be remotely controlled. The remote sensor(s)/actuator(s) can interface with unique remote transceivers that transmit and/or receive data. If necessary in individual applications, signal repeaters may relay information between the transceiver(s) and the gateway interface. Communication links between the remote transceivers and the gateway interface are preferably wireless, but may also be implemented with a mixture of wireless and wired communication links.

To successfully communicate between the transceiver(s) and the gateway interface, a preferred embodiment of the present invention can receive a plurality of RF signal transmissions containing a packet protocol via a preferred embodiment of data structures that include sender and receiver identifiers, a description of the packet itself, a message number, commands, data, and an error detector. The data structure can be integrated with alternate data communication protocols for use with many other communication systems and networks. Also, a preferred embodiment of the present invention can be integrated into an existing control system using networked wireless transceivers. Distinct control signals from the pre-existing system can be mapped into the packet protocol enabling integration into a pre-existing control system easily and inexpensively.

BRIEF DESCRIPTION OF THE DRAWINGS

FIG. 7 is a table illustrating the message protocol in accordance with a preferred embodiment of the present invention.

FIG. 8 is a table illustrating various "to" addresses in accordance with a preferred embodiment of the present invention.

FIG. 9 illustrates three sample messages using a message protocol system in accordance with an embodiment of the present invention.

DETAILED DESCRIPTION OF PREFERRED EMBODIMENTS

Figure 1:
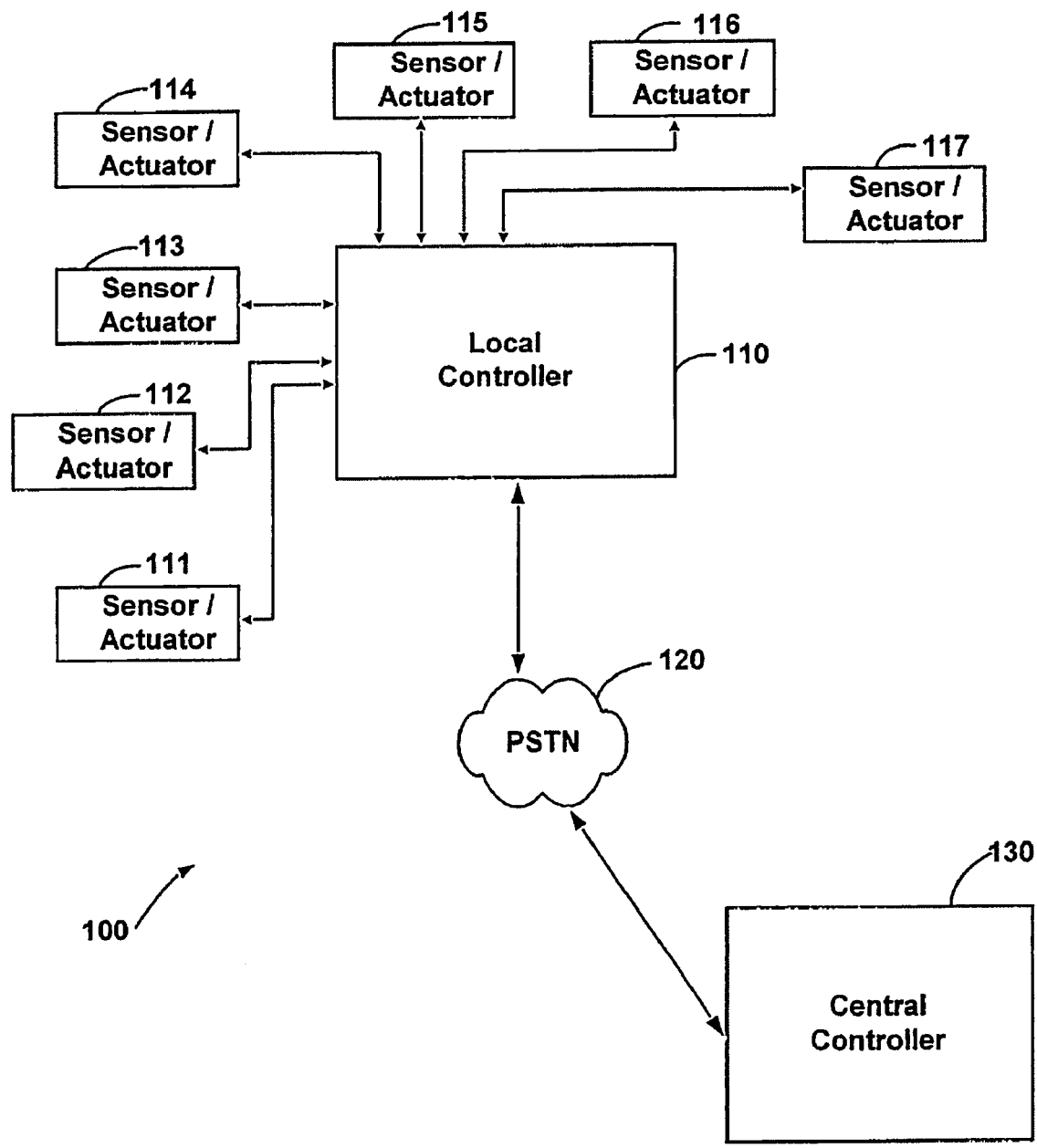
FIG. 1 is a block diagram of a prior art control system.
Figure 2:
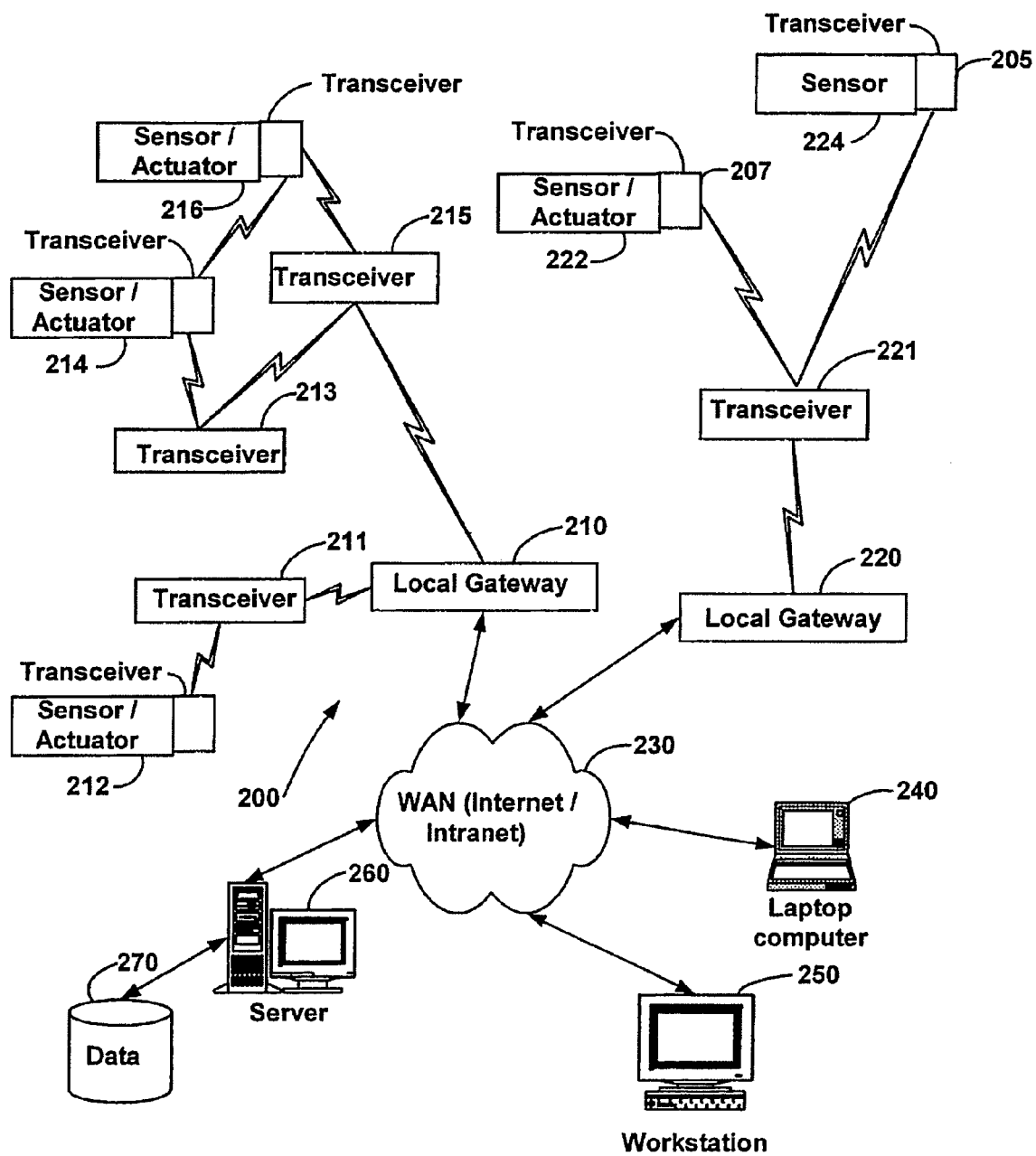
FIG. 2 is a block diagram illustrating a monitoring/control system in accordance with a preferred embodiment of the present invention.

FIG. 2 sets forth a block diagram illustrating a preferred embodiment of a control system 200 in accordance with the present invention. The control system 200 can consist of one or more transceivers. An exemplary transceiver 205 can be integrated with a sensor 224 to form a first combination. A second transceiver 207 can be integrated with an actuator 222 to form a second combination. The transceivers 205, 207 are preferably wireless RF transceivers that are small and transmit a low-power-RF signal. As a result, in some applications, the transmission range of a given transceiver 205, 207 may be limited. As will be appreciated from the description that follows, this limited transmission range of the transceivers 205, 207 can be a desirable characteristic of the control system 200. Although the transceivers 205, 207 are depicted without user interfaces such as a keypad (not shown), the transceivers 205, 207 may be configured with user selectable buttons or an alphanumeric keypad (not shown). Often, the transceivers 205, 207 can be electrically interfaced with a sensor/actuator 222 such as a smoke detector, a thermostat, or a security system, where external buttons are not needed.

One or more specific types of RF transceivers can be used with the various embodiments of the present invention. For example, one RF transceiver that may be used is the TR1000, manufactured by RF Monolithics, Inc. The TR1000 hybrid transceiver is well suited for short range, wireless data applications where robust operation, small size, low power consumption, and low-cost are desired. All critical RF functions may be performed within a single hybrid semi-conductor chip, simplifying circuit design and accelerating the design-in process. The receiver section of the TR1000 is sensitive and stable. A wide dynamic range log detector, in combination with digital automatic gain control (AGC) provides robust performance in the presence of channel noise or interference. Two stages of surface acoustic wave (SAW) filtering provide excellent receiver out-of-band rejection. The TR100 includes provisions for both on-off keyed (OOK) and amplitude-shift key (ASK) modulation. The TR100 employs SAW filtering to suppress output harmonies, for compliance with FCC and other regulations.

Additional details of the TR1000 transceiver need not be described herein, because the present invention is not limited by the particular choice of transceiver. Indeed, numerous RF transceivers may be implemented in accordance with the teachings of the present invention. Such other transceivers may include other 900 MHz transceivers, as well as transceivers at other frequencies. In addition, infrared, ultrasonic, and other types of wireless transceivers may be employed. Further details of the TR1000 transceiver may be obtained through data sheets, application notes, design guides (e.g., the "ASH Transceiver Designers Guide"), and other publications.

The control system 200 can also include a plurality of stand-alone transceivers 211, 213, 215, and 221. Each of the stand-alone transceivers 211, 213, 215, and 221, and each of the integrated transceivers 212, 214, 216, 222, and 224 can receive an incoming RF transmission and transmit an outgoing signal. This outgoing signal may be a low-power-RF transmission signal, a high-power-RF transmission signal, or may be electric signals transmitted over a conductive wire, a fiber optic cable, or other transmission media. It will be appreciated by those skilled in the art that the integrated transceivers 212, 214, 216, 222, and 224 can be replaced by RF transmitters for applications that require continuous data collection only.

The local gateways 210 and 220 can receive remote data transmissions from one or more of the stand-alone transceivers 211, 213, 215, and 221, or one or more of the integrated transceivers 212, 214, 216, 222, and 224. The local gateways 210 and 220 can analyze the transmissions received, convert the transmissions into TCP/IP format, and further communicate the remote data signal transmissions via the WAN 230. The local gateways 210 and 220 may communicate information, service requests, and/or control signals to the remote integrated transceivers 212, 214, 216, 222, and 224, from the server 260, the laptop computer 240, and/or the workstation 250 across the WAN 230. The server 260 can be further networked with the database server 270 to record client specific data. Further information regarding the integration of embodiments of the present invention into the WAN 230 can be found in U.S. Pat. No. 6,891,838 application entitled, "System and Method for Monitoring and Controlling Residential Devices."

It will be appreciated by those skilled in the art that if an integrated transceiver (either of 212, 214, 216, 222, and 224) is located sufficiently close to one of the local gateways 210 or 220 such that the integrated transceiver's outgoing signal can be received by a gateway, the outgoing signal need not be processed and repeated through one of the stand-alone transceivers 211, 213, 215, or 221.

A monitoring system constructed in accordance with the teachings of the present invention may be used in a variety of environments. In accordance with a preferred embodiment, a monitoring system 200 such as that illustrated in FIG. 2 may be employed to monitor and record utility usage by residential and industrial customers, to transfer vehicle diagnostics from an automobile via a RF transceiver integrated with the vehicle diagnostics bus to a local transceiver that further transmits the vehicle information through a local gateway onto a WAN, to monitor and control an irrigation system, or to automate a parking facility. Further information regarding these individual applications can be found in U.S. Pat. No. 6,891,838 entitled, "System and Method for Monitoring and Controlling Residential Devices."

The integrated transceivers 212, 214, 215, 222, and 224 can have substantially identical construction (particularly with regard to their internal electronics), which provides a cost-effective implementation at the system level. Alternatively, the transceivers (integrated or stand-alone) can differ as known to one of ordinary skill in the art as necessitated by individual design constraints. Furthermore, a plurality of stand alone transceivers 211, 213, 215, and 221, which may be identical, can be disposed in such a way that adequate RF coverage is provided. Preferably, the stand-alone transceivers 211, 213, 215, and 221 may be dispersed sufficient that only one stand-alone transceiver will pick up a transmission from a given integrated transceiver 212, 214, 216, 222, and 224 (due in part to the low power transmission typically emitted by each transmitter).

In certain instances, however, two or more, stand-alone transceivers may pick up a single transmission. Thus, the local gateways 210 and 220 may receive multiple versions of the same data transmission from an integrated transceiver, but from different stand-alone transceivers. The local gateways 210 and 220 may utilize this information to triangulate or otherwise more particularly assess a location from which the common data transmission is originating. Due to the transmitting device identifier incorporated within the preferred protocol in the transmitted signal, duplicative transmissions (e.g., transmissions duplicated to more than one gateway or to the same gateway) may be ignored or otherwise appropriately handled.

The advantage of integrating a transceiver, as opposed to a one-way transmitter, with the sensor is the transceiver's ability to receive incoming control signals and to transmit data signals upon demand. The local gateways 210 and 220 may communicate with all system transceivers. Since the local gateways 210 and 220 can be permanently integrated with the WAN 230, the server 260 coupled to the WAN 230 can host application specific software. Further, the data monitoring and control devices of the present invention can be movable as necessary given that they remain within signal range of a stand-alone transceiver 211, 213, 215, or 221 that subsequently is within signal range of a local gateway 210, 220 interconnected through one or more networks to server 260. As such, small application specific transmitters compatible with control system 200 can be worn or carried. It will be appreciated that a person so equipped may be in communication with any device communicatively coupled with the WAN 230.

In one embodiment, the server 260 collects, formats, and stores client specific data from each of the integrated transceivers 212, 214, 216, 222, and 224 for later retrieval or access from the workstation 250 or the laptop 240. The workstation 250 or the laptop 240 can be used to access the stored information through a Web browser. In another embodiment, the server 260 may perform the additional functions of hosting application specific control system functions and replacing the local controller by generating required control signals for appropriate distribution via the WAN 230 and the local gateways 210, 220 to the system actuators. In another embodiment, clients may elect for proprietary reasons to host any control applications on their own WAN connected workstation. The database 270 and the server 260 may act solely as a data collection and reporting device with the client workstation 250 generating control signals for the system.

Figure 3:
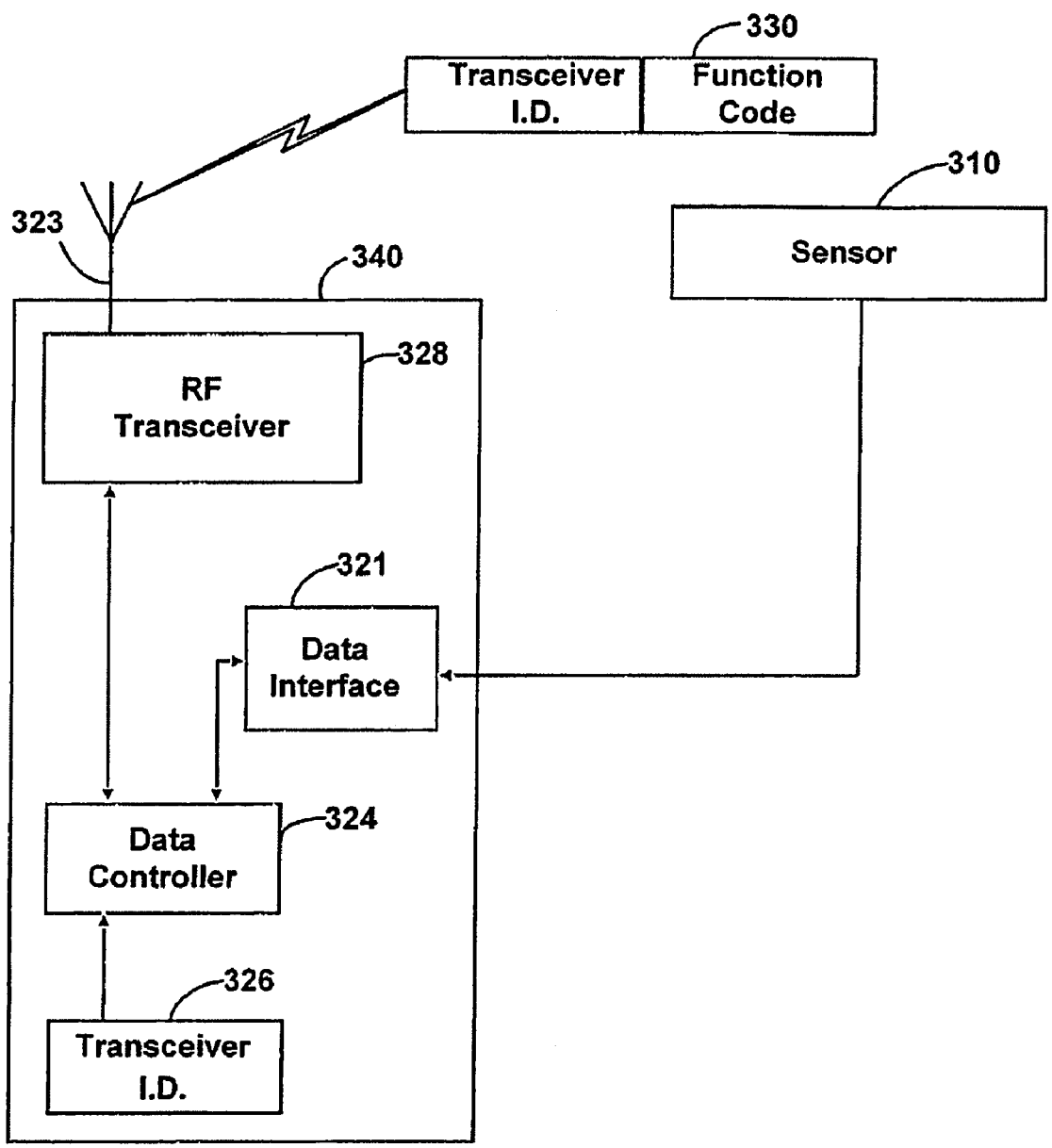
FIG. 3 is a block diagram illustrating a transceiver in accordance with a preferred embodiment of the present invention.

Reference is now made to FIG. 3, which is a block diagram illustrating certain functional blocks of a transceiver 340 that may be integrated with sensor 310 in accordance with a preferred embodiment of the present invention. For example, sensor 310 in its simplest form can be a two-state device, such as a smoke alarm. Alternatively, the sensor 310 may output a continuous range of values to the data interface 321 such as a thermometer. If the signal output from the sensor 310 is an analog signal, the data interface 321 may include an analog-to-digital converter (not shown) to convert signals output to the transceiver 340. Alternatively, a digital interface (communicating digital signals) may exist between the data interface 321 and each sensor 310.

The sensor 310 can be communicatively coupled with the RF transceiver 340. The RF transceiver 340 may comprise a RF transceiver controller 328, a data interface 321, a data controller 324, a transceiver identifier 326, and an antenna 328. As shown in FIG. 3, a data signal forwarded from the sensor 310 may be received at an input port of the data interface 321. The data interface 321 may be configured to receive the data signal. In those situations where the data interface has received an analog data signal, the data interface 321 may be configured to convert the analog signal into a digital signal before forwarding a digital representation of the data signal to the data controller 324.

In accordance with a preferred embodiment, each transceiver 340 may be configured with a unique transceiver identification 326 that uniquely identifies the RF transceiver 340. The transceiver identification 326 may be programmable, and implemented an EPROM. Alternatively, the transceiver identification 326 may be set and/or configured through a series of dual inline package (DIP) switches. Additional implementations of the transceiver identification 326, whereby the number may also be set and/or configured as desired, may be implemented.

The unique transceiver identification 326 coupled with a function code for a sensor "on" condition can be formatted by data controller 324 for transformation into the RF signal 330 by RF transmitter 328 and transmission via antenna 323.

While the unique transceiver address can be varied, it is preferably a six-byte address. The length of the address can be varied as necessary given individual design constraints. This data packet 330 communicated from transceiver 340 will readily distinguish from similar signals generated by other transceivers in the system.

Of course, additional and/or alternative configurations may also be provided by a similarly configured transceiver. For example, a similar configuration may be provided for a transceiver that is integrated into, for example, a carbon monoxide detector, or a door position sensor. Alternatively, system parameters that vary across a range of values may be transmitted by transceiver 340 as long as data interface 321 and data controller 324 are configured to apply a specific code that is consistent with the input from sensor 310. As long as the code was understood by the server 260 or workstation 250, the target parameter can be monitored by the embodiments of the present invention.

Figure 4:
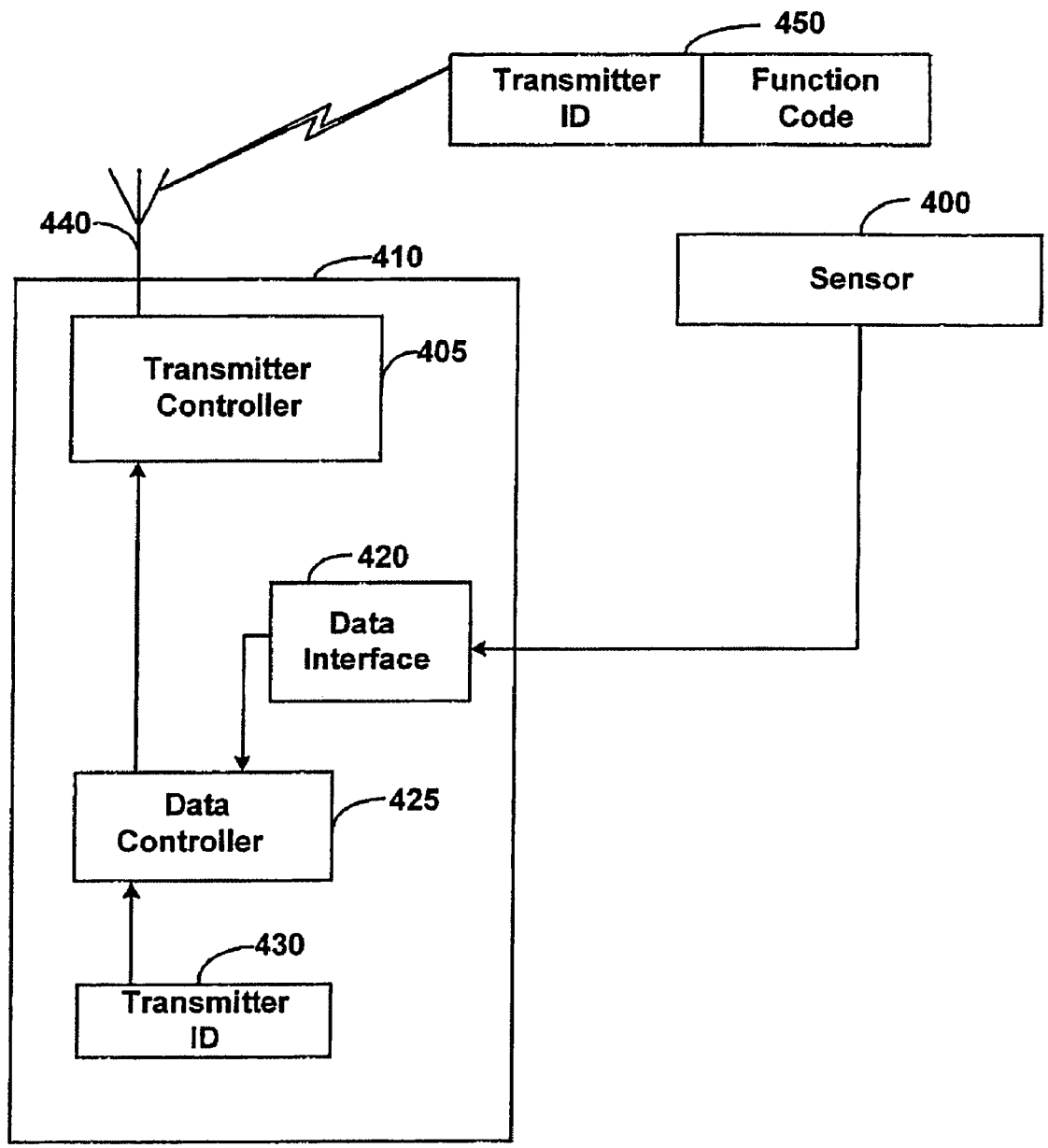
FIG. 4 is a block diagram illustrating a transmitter in accordance with a preferred embodiment of the present invention.

Reference is now made to FIG. 4. FIG. 4 is a block diagram illustrating a transmitter in accordance with a preferred embodiment of the present invention. The sensor 400 may be coupled to the RF transmitter 410. The RF transmitter 410 may comprise a transmitter controller 405, a data interface 420, a data controller 425, a transmitter identification 430, and an antenna 440. The data signal forwarded from the sensor 400 may be received at an input port of the data interface 420. The data interface 420 may be configured to receive the data signal. In those situations where the data interface 420 has received an analog data signal, the data interface 420 may be configured to convert the analog signal into a digital signal before forwarding a digital representation of the data signal to the data controller 425.

Each transmitter/transceiver 410 may be configured with a unique transmitter identification 430 that uniquely identifies the RF transmitter 410. The transmitter identification number 430 may be programmable, and implemented with an EPROM. Alternatively, the transmitter identification 430 may be set and/or configured through a series of dual inline package (DIP) switches. Additional implementations of the transmitter identification 430, whereby the identification may be set and/or configured as desired, may also be implemented.

The data controller 425 may be configured to receive both a data signal from the data interface 420 and the transmitter identification 430. The data controller 425 may be configured to format (e.g., concatenate) both data portions into a composite information signal. The composite information signal may be forwarded to the transmitter controller 415 which can then transmit the encoded RF signal from the sensor 400 via a packet message protocol system. The transmitter controller 415 may convert information from digital electronic form into a format, frequency, and voltage level suitable for transmission from antenna 440. The transmitter identification 430 can be set for a given transmitter 410. When received by the application server 260 (FIG. 2), the transmitter identification 430 may be used to access a look-up table that identifies, for example, the location, the system, and the particular parameter assigned to that particular transmitter. Additional information about the related system may also be provided within the lookup table, with particular functional codes associated with a corresponding condition or parameter, such as but not limited to, an appliance operating cycle, a power status, a temperature, a position, and other information.

Figure 5:
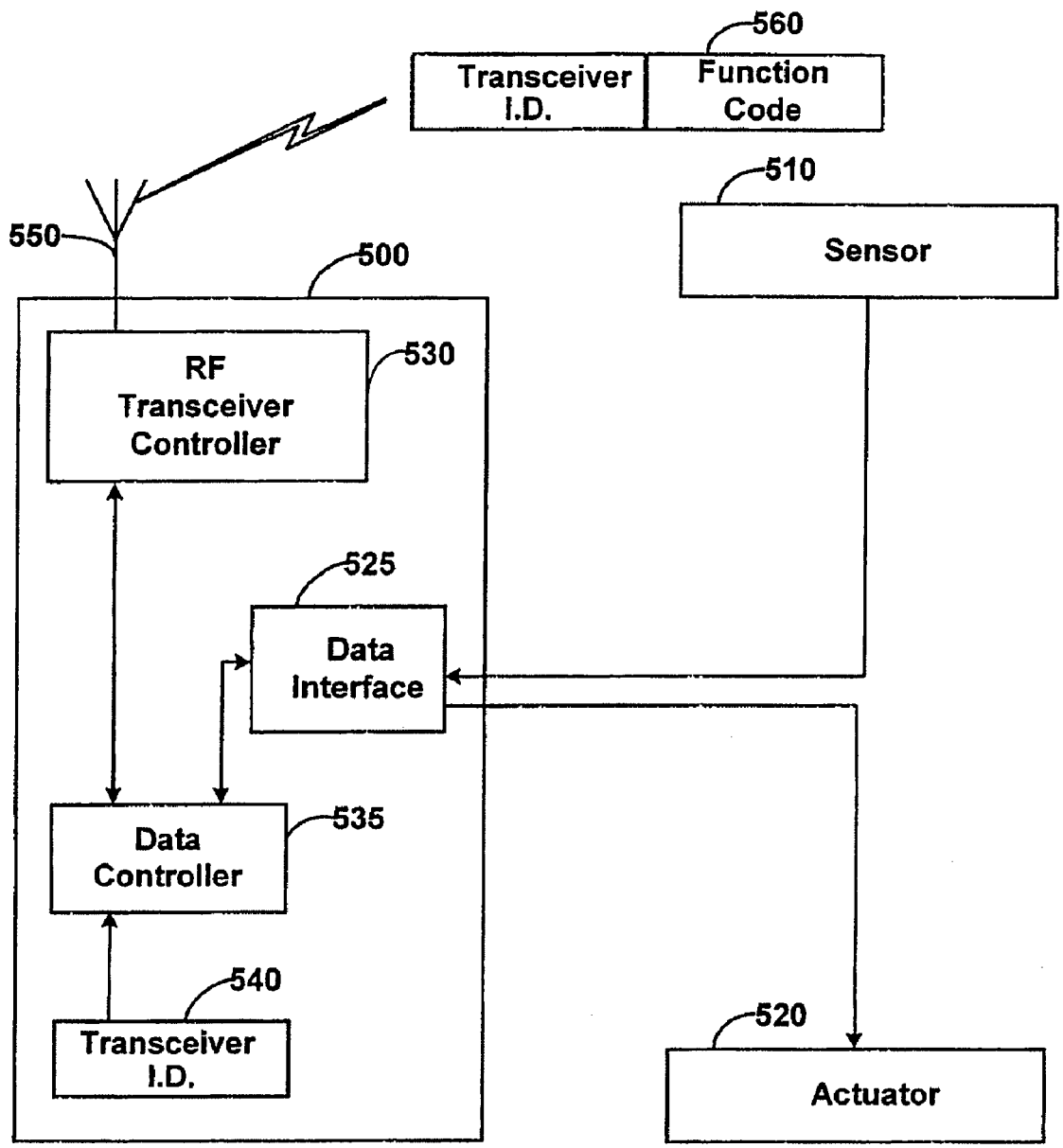
FIG. 5 is a block diagram illustrating a transceiver in accordance with a preferred embodiment of the present invention integrated with a sensor and an actuator.

FIG. 5 sets forth a block diagram of the transceiver 500 integrated with a sensor 510 and an actuator 520 in accordance with a preferred embodiment of the present invention. Here, the data interface 525 is shown with a single input from the sensor 510. It is easy to envision a system that may include multiple sensor inputs. The RF transceiver 500 may comprise a transceiver controller 530, a data interface 525, a data controller 535, a transceiver identification 540, and an antenna 550. The data signal forwarded from the sensor 510 may be received at an input/output port of the data interface 525. The data interface 525 may be configured to receive the data signal and transmit a command signal. In those situations where the data interface 525 has received an analog data signal, the data interface 525 may be configured to convert the analog signal into a digital signal before forwarding a digital representation of the data signal to the data controller 525. Similarly, when the data controller 535 forwards a digital representation of a command signal, the data interface 525 may be configured to translate the digital command signal into an analog voltage suitable to drive the actuator 520.

In accordance with a preferred embodiment, each RF transceiver 500 may be configured with a unique transceiver identification 540 that uniquely identifies the RF transceiver 500. The transceiver identification 540 may be set or configured as described above.

The data controller 535 may be configured to receive both a data signal from the data interface 525 and the transceiver identification number 540. The data controller 535 may also receive one or more data signals from other RF communication devices. As previously described, the data controller 535 may be configured to format (e.g., concatenate) both data signal portions originating at the RF transceiver 500 into a composite information signal which may also include data information from other closely located RF communication devices. The composite information signal may be forwarded to a transceiver controller 530, which may be configured to transmit the encoded RF data signals via the packet messaging system. It will be appreciated that the transceiver controller 530 may convert information from digital electronic form into a format, frequency, and voltage level suitable for transmission from the antenna 550.

For example, a common home heating and cooling system might be integrated with an embodiment of the present invention. The home heating system may include multiple data interface inputs from multiple sensors. A home thermostat control connected with the home heating system could be integrated with a sensor that reports the position of a manually adjusted temperature control (i.e., temperature set value) and a sensor integrated with a thermister to report an ambient temperature. The condition of related parameters can be sent to the data interface 525 as well as including the condition of the system on/off switch, the climate control mode selected (i.e., heat, fan, or AC). In addition, depending upon the specific implementation, other system parameters may be provided to data interface 525 as well.

The addition of the actuator 520 to the integrated transceiver 500 permits the data interface 525 to apply signals to the manual temperature control for the temperature set point, the climate control mode switch, and the system on/off switch. This, a remote workstation 250 or a laptop 240 with WAN access (see FIG. 2) could control a home heating system from a remote location.

Again, each of these various input sources can be routed to the data interface 525, which provides the information to the data controller 535. The data controller 535 may utilize a look up table to access unique function codes that are communicated in the data packet 560, along with a transceiver identification code 540, to the local gateway and further onto the WAN. In general, the operation of RF transceiver 500 will be similar to that described above.

The various RF communication devices illustrated and described may be configured with a number of optional power supply configurations. For example, a personal mobile transceiver may be powered by a replaceable battery. Similarly, a stand-alone RF transceiver repeater may be powered by a replaceable battery that may be supplemented and/or periodically charged via a solar panel. These power supply circuits, therefore, may differ from RF communication device to RF communication device depending upon the remote system monitored, the related actuators to be controlled, the environment, and the quality of service level required. Those skilled in the art will appreciate and understand how to meet the power requirements of the various RF communication devices. As a result, it is not necessary to further describe a power supply suitable for each RF communication device and each application in order to appreciate the concepts and teachings of the present invention.

Figure 6:
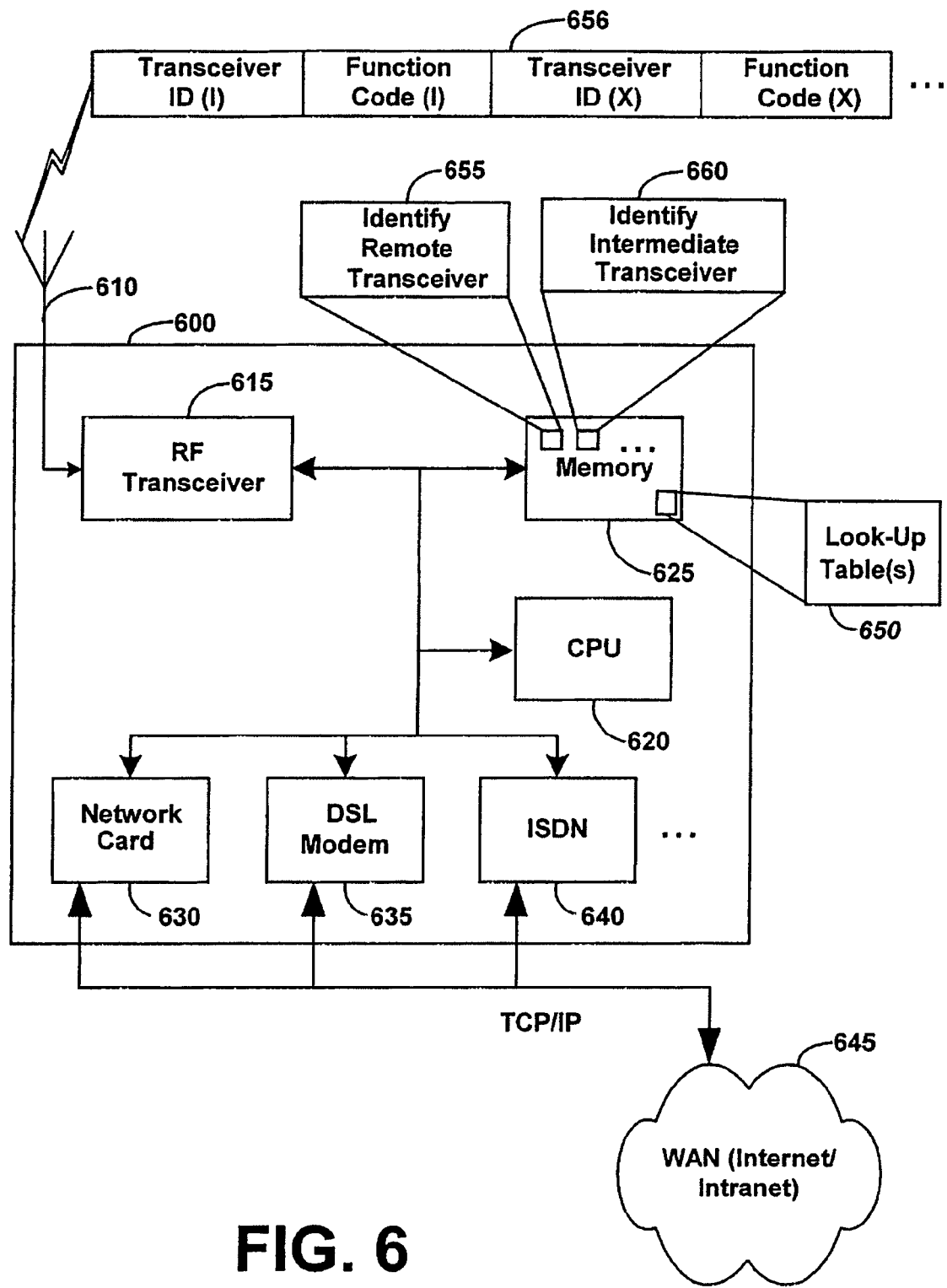
FIG. 6 is a block diagram illustrating a local gateway in accordance with a preferred embodiment the present invention.

Having illustrated and described the operation of the various combinations of RF communication devices with the various sensors 114 and sensor actuators 112 consistent with the present invention, reference is now made to FIG. 6. FIG. 6 is a block diagram further illustrating a local gateway 600 in accordance with a preferred embodiment of the present invention. A local gateway 600 may comprise an antenna 610, an RF transceiver 615, a central processing unit (CPU) 620, a memory 625, a network card 630, a digital subscriber line (DSL) modem 635, and an integrated services digital network (ISDN) interface card 640. The local gateway 600 can also include many other components not illustrated in FIG. 6, capable of enabling a terminal control protocol Internet protocol (TCP/IP) connection to the WAN 130.

The RF transceiver 615 may be configured to receive incoming RF signal transmissions via an antenna 610. Each of the incoming RF signal transmissions can be consistently formatted in the convention previously described. The local gateway 600 may also be configured such that the memory 625 includes a look-up table 650 that may assist in identifying the various remote and intermediate RF communication devices used in generating and transmitting the received data transmission as illustrated in memory sectors 650 and 660 herein labeled, "Identify Remote Transceiver" and "Identify Intermediate Transceiver," respectively. Programmed or recognized codes within the memory 625 may also be provided and configured for controlling the operation of a CPU 620 to carry out the various functions that are orchestrated and/or controlled by the local gateway 600. For example, the memory 625 may include program code for controlling the operation of the CPU 625 to evaluate an incoming data packet to determine what action needs to be taken. One or more look-up tables 650 may also be stored within the memory 625 to assist in this process. Furthermore, the memory 625 may be configured with program code to identify a remote RF transceiver 655 or identify an intermediate RF transceiver 660. Function codes, RF transmitter and/or RF transceiver identification numbers may all be stored with associated information in the look-up tables 650.

Thus, one look-up table 650 may be provided to associate transceiver identifications with a particular user. Another look-up table 650 may be used to associate function codes with the interpretation thereof. For example, a unique code may be associated by a look-up table 650 to identify functions such as test, temperature, smoke alarm active, or security system breach. In connection with the lookup table(s) 650, the memory 625 may also include a plurality of code segments that are executed by the CPU 620, which may control operation of the gateway 600. For example, a first data packet segment 665 may be provided to access a first lookup table to determine the identity of the RF transceiver 625, which transmitted the received message. A second code segment may be provided to access a second lookup table to determine the proximate location of the message generating RF transceiver 600, by identifying the RF transceiver 600 that relayed the message. A third code segment may be provided to identify the content of the message transmitted. Namely, is it a fire alarm, a security alarm, an emergency request by a person, or a temperature control setting. Additional, fewer, or different code segments may be provided to carry out different functional operations and data signal transfers.

The local gateway 600 may also include one or more mechanisms to facilitate network based communication with remote computing devices. For example, the gateway 600 may include a network card 630, which may allow the gateway 600 to communicate across a local area network to a network server, which in turn may contain a backup gateway 110 to the WAN 645. Alternatively, the local gateway 600 may contain a DSL modem 635, which may be configured to provide a link to a remote computing system, by way of the PSTN. In yet another alternative, the local gateway 600 may include an ISDN card 640 configured to communicate via an ISDN connection with a remote system. Other communication interfaces may be provided as well to serve as primary and or backup links to the WAN 645 or to local area networks that might serve to permit local monitoring of local gateway 600 health and data packet control.

For each of the remote devices to communicate, there needs to be a standard enabling each device to understand a message. FIG. 7 sets forth a format of a data packet protocol in accordance with a preferred embodiment of the present invention. All messages transmitted within the system consist of a "to" address 700, a "from" address 710, a packet number 720, a number of packets in a transmission 730, a packet length 740, a message number 750, a command number 760, any data 770, and a check sum error detector (CKH 780 and CKL 790).

The "to" address 700 can indicate the intended recipient of the packet. This address can be scalable from one to six bytes based upon the size and complexity of the system. By way of example, the "to" address 700 can indicate a general message to all transceivers, to only the stand-alone transceivers, or to an individual integrated transceiver. In a six byte "to" address, the first byte indicates the transceiver type to all transceivers, to some transceivers, or a specific transceiver. The second byte can be the identification base, and bytes three through six can be used for the unique transceiver address (either stand-alone or integrated). The "to" address 700 can be scalable from one byte to six bytes depending upon the intended recipient(s).

The "from" address 710 can be a the six-byte unique transceiver address of the transceiver originating the transmission. The "from" address 710 can be the address of the controller when the controller requests data, or this can be the address of the integrated transceiver when the integrated transceiver sends a response to a request for information to the controller.

The packet number 720, the packet maximum 730, and the packet length 740 can be used to concatenate messages that are greater than 128 bytes. The packet maximum 730 can indicate the number of packets in the message. The packet number 720 may be used to indicate a packet sequence number for a multiple-packet message.

The message number 750 can be originally assigned by the controller. Messages originating from the controller can be assigned an even number. Responses to the controller can be the original message number plus one, rendering the responding message number odd. The controller can then increment the message number 750 by two for each new originating message. This enables the controller to coordinate the incoming responses to the appropriate command message.

The next section is the command byte 760 that requests data from the receiving device as necessary. There can be two types of commands: device specific and not device specific. Device specific commands can control a specific device such as a data request or a change in current actuator settings. A number of commands are not device specific. Such commands are for example, but not limited to, a ping, an acknowledge, a non-acknowledgement, downstream repeat, upstream repeat, read status, emergency message, and a request for general data, among others. General data may include a software version number, the number of power failures, and/or the number of resets.

The data 770 section may contain data as requested by a specific command. The requested data can be many values. By way of example, test data can be encoded in ASCII (American Standard Code for Information Interchange) or many other encoding systems. The data section of a single packet can be scalable up to 109 bytes. When the requested data exceeds 109 bytes, the integrated transceiver can divide the data into appropriate number of sections and concatenates the series of packets for one message using the packet identifiers as discussed above.

The checksum sections 780, 790 can be used to detect errors in the transmissions. In one embodiment, any error can be detected via cyclic redundancy check sum methodology. This methodology divides the message as a large binary number by the generating polynomial (in this case, CRC-16). The remainder of this division is then sent with the message as the checksum. The receiver then calculates a checksum using the same methodology and compares the two checksums. If the checksums do not match, the packet or message will be ignored. While this error detection methodology is preferred, many other error detection systems can be used.

In one embodiment of this invention, this system can be implemented via an RF link at a basic rate of 4,800 bits per second (bps) with a data rate of 2,400 bps. All the data can be encoded in the Manchester format such that a high to low transition at the bit center point represents a logic zero and a low to high transition represents a logic one. Other RF formats can be used depending upon individual design constraints. For example, a quadrature phase shift encoding method could be used, enabling the control system to communicate via hexadecimal instead of binary.

While the message indicates specific byte length for each section, only the order of the specific information within the message is constant. The byte position number in individual transmissions can vary because of the scalability of the "to" address, the command byte, and the scalability of the data.

The message can further include a preface and a postscript (not shown). The preface and postscripts are not part of the message body, but rather serve to synchronize the control system and to frame each packet of the message. The packet begins with the preface and ends with a postscript. The preface can be a series of twenty-four logic ones followed by two bit times of high voltage with no transition. The first byte of the packet can then follow immediately. The postscript will be a transition of the transmit data line from a high voltage to a low voltage, if necessary. It is less desirable to not leave the transmit data line high after the message is sent.

FIG. 8 sets forth a preferred embodiment of the "to" address byte assignment in accordance with an embodiment of the present invention. As shown in FIG. 8, the "to" address consists of six bytes. The first byte (Byte 1) can indicate the device type. The second byte (Byte 2) can indicate the manufacturer or the owner. The third byte (Byte 3) can be a further indication of the manufacturer or owner. The fourth byte (Byte 4) can either indicate that the message is for all devices, or that the message is for a particular device. If the message is for all devices, the fourth byte can be a particular code. If the message is for a particular device, the fourth, fifth, and sixth bytes (Byte 5 and Byte 6) can be a unique identifier for the particular devices.

Having described a general message structure in accordance with an embodiment of the present invention, reference is made to FIG. 9. FIG. 9 illustrates three sample messages. The first message 910 illustrates the broadcast of an emergency message "FF" from a central server with an address "0012345678" to a integrated transceiver with an address of "FF."

The second message 920 illustrates how the first message might be sent to a stand-alone transceiver. Emergency message "FF" from a central server with address "00123456578" can be first sent to stand-alone transceiver "FO." The second message contains additional command data "A000123456" that may be used by the system to identify further transceivers to send the signal through on the way to the destination device.

The third message 930 illustrated in FIG. 9 illustrates how the message protocol of the present invention may be used to "ping" a remote transceiver to determine transceiver health. For example, source unit "E112345678" may originate a ping request by sending command "08" to a transceiver identified as "A012345678." The response to the ping request can be as simple as reversing the "to address" and the "from address" of the command such that a healthy receiver will send a ping message back to the originating device. A system in accordance with a preferred embodiment of the present invention may be configured to expect a return ping within a specific time period. Operators of the present invention could use the delay between the ping request and the ping response to model system loads and to determine if specific system parameters might be adequately monitored and controlled with the expected feedback transmission delay of the system.

Returning to FIG. 2, the local gateway 210 can act as a local communications master in a system, such as system 200. With the exception of emergency messages, the local gateway 210 usually initiates communications with any remote transceivers (either stand-alone 211, 213, 215, 221 or integrated 212, 214, 216, 224). The remote transceivers then respond based upon the command received in the message. In general, the local gateway 210 expects a response to all messages sent to any of the remote transceivers 211, 212, 213, 214, 215, 216, 221, and 225.

To acknowledge a message, any of the remote transceivers 211, 212, 213, 214, 215, 216, 221, 224 can send one of two messages: a positive acknowledgement or a negative acknowledgement. The positive acknowledgement may have two forms. When the message is between the local gateway 210 or a stand-alone transceiver 211, 213, 215, 221 and another stand-alone transceiver 211, 213, 215, 221, the acknowledgement can be a re-send the original message with no changes. The second form is for a message sent from the local gateway 210 stand-alone transceiver 211, 213, 215, 221 to a integrated transceiver 212, 214, 216, 224. In this case, the positive acknowledgement can be a message containing the requested data.

Emergency messages are preferably the only messages initiated by the integrated transceivers 212, 214, 216, 224. To accommodate receiving any emergency messages, the local gateway 210 may dedicate one-half of every ten-second period to receive emergency messages. During these time periods, the local gateway 210 may not transmit messages other than acknowledgements to any emergency messages. The integrated transceivers 212, 214, 216, 224 may detect the period of silence, and in response, may then transmit the emergency message.

There are typically two forms of emergency messages: from personal safety/security transceiver(s) and from permanently installed safety/security transceiver(s). In the first case of the personal transceiver, the emergency message can consist of a predetermined "to" address and an odd, random number. In response to this emergency message, the local gateway 210 can acknowledge during a silent period. The personal transceiver can then repeat the same emergency message. The local gateway 210 can then forward the emergency message on to the WAN 230 in the normal manner.

Upon receipt of the local gateway 210 acknowledgement, the personal transceiver can reset itself. If no acknowledgement is received within a predetermined time period, the personal transceiver may continue to re-transmit the original emergency message until acknowledged by the local gateway 210 for a predetermined number of re-transmissions.

In the second case, the permanently installed safety/security transceiver (212) may send one message to the local gateway 210 during a time out period. The emergency message can be transmitted to a predetermined address other than the emergency address for personal transceivers.

The foregoing description has illustrated certain fundamental concepts of the invention, and other additions and/or modifications may be made consistent with the inventive concepts. For example, the one-way transmitters may be adapted to continuously monitor the current status of water, gas, and other utility meters. One-way transmitters might further be used to monitor and report actual operational hours on rental equipment or any other apparatus that must be serviced or monitored on an actual run-time schedule.

The transceivers of the current invention may be adapted to monitor and apply control signals in an unlimited number of applications. For example, two-way transceivers of the current invention can be adapted for use with pay-type-publicly-located telephones, cable television set converter boxes, and a host of residential appliances and devices enabling a remote controllable home automation and security system. For example, building automation systems, fire control systems, alarm systems, industrial trash compactors, and building elevators can be monitored and controlled with devices consistent with the present invention. In addition, courier drop boxes, time clock systems, automated teller machines, self-service copy machines, and other self-service devices can be monitored and controlled as appropriate. By way of further example, a number of environment variables that require monitoring can be integrated with the system of the present invention to permit remote monitoring and control. For instance, light levels in the area adjacent to automated teller machines must meet minimum federal standards. Also, the water volume transferred by water treatment plant pumps, smokestack emissions from a coal burning power plant or a coke fueled steel plant oven can be remotely monitored.

In a geographic area appropriately networked with permanently located stand-alone transceivers consistent with the embodiments of the invention, personal transceivers can be used to monitor and control personnel access and egress from specific rooms or portions within a controlled facility. Personal transceivers can also be configured to transfer personal information to public emergency response personnel, to transfer personal billing information to vending machines, or to monitor individuals within an assisted living community.

The transceivers using the packet message protocol of the present invention may be further integrated with a voice-band transceiver. As a result, when a person presses, for example, the emergency button on a transmitter, medical personnel, staff members, or others may respond by communicating via two-way radio with the person. Each transceiver may be equipped with a microphone and a speaker enabling a person to communication information such as their present emergency situation or their specific location.

The foregoing description has been presented for purposes of illustration and description. It is not intended to be exhaustive or to limit the inventions to the precise embodiments disclosed. Obvious modifications or variations are possible in light of the above teachings. For example, the transceiver can be permanently integrated into an alarm sensor or other stationary device within a system, and the control system server and/or local gateway could be configured to identify the transceiver location by the transceiver identification number alone. It will be appreciated that, in embodiments that do not utilize stand-alone transceivers, the transceivers will be configured to transmit at a high RF power level to effectively communicate with the control system local gateway.

It will be appreciated by those skilled in the art that the information transmitted and received by the wireless transceivers of the present invention may be further integrated with other data transmission protocols for transmission across telecommunications and computer networks. In addition, it should be further appreciated that telecommunications and computer networks can function as a transmission path between the networked wireless transceivers, the local gateways, and the central server.

While the various embodiments of this invention have been described in detail with particular reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all applicable equivalents.

I claim:

1. In a communication system to communicate command and sensed data between remote devices, the system comprising:
    a receiver address comprising a scalable address of at least one remote device;
    a command indicator comprising a command code;
    a data value comprising a scalable message; and
    a controller associated with a remote wireless device comprising a transceiver configured to send and receive wireless signals, the remote device configured to send a preformatted message comprising the receiver address, a command indicator, and the data value via the transceiver to at least one other remote device.

2. The system of claim 1, further comprising:
    a plurality of transceivers each having a unique address, the transceiver being one of the plurality of transceivers;
    a plurality of controllers associated with each the controller associated with at least one of the transceivers, the controller being in communication with at least one other transceiver with a preformatted message, the preformatted message having at least one scalable field;
    at least one sensor associated with at least one of the transceivers to detect a condition and output a data signal to the transceiver; and
    at least one actuator associated with at least one of the transceivers to activate a device.

3. The system of claim 1, wherein the controller sends the preformatted message via an associated transceiver, and at least one transceiver sends the preformatted response message.

4. The system of claim 1, wherein at least one transceiver receives the preformatted message requesting sensed data, confirms the receiver address as its own unique address, receives a sensed data signal, formats the sensed data signal into scalable byte segments, determines the number of segments required to contain the sensed data signal, and generates and transmits the preformatted response message comprising at least one packet.

5. The system of claim 4, wherein the packet further comprises:
    a preface having a predetermined sequence including a first logic level and a subsequent sequence comprising at least two bytes of a second logic level; and
    a postscript having a low voltage output.

6. The system of claim 1, wherein each remote device is adapted to transmit and receive radio frequency transmissions to and from at least one other transceiver.

7. The system of claim 1, wherein the preformatted message comprises Manchester encoding.

8. A method of communicating command and sensed data between remote wireless devices, the method comprising:
    providing a receiver to receive at least one message;
    wherein the message has a packet that comprises a command indicator comprising a command code, a scalable data value comprising a scalable message, and an error detector that is a redundancy check error detector; and
    providing a controller to determine if at least one received message is a duplicate message and determining a location from which the duplicate message originated.

9. The method of claim 8, further comprising providing at least one remote wireless communication device, wherein at least one of the devices comprise geographically remote transceivers adapted to transmit and receive the at least one message using radio frequency transmissions.

10. The method of claim 8, further comprising providing at least one remote wireless communication device, wherein at least one of the devices has a unique address and the packet further comprises at least one scalable address field to contain the unique address for at least one device.

11. The method of claim 8, further comprising providing an actuator associated with at least one of the remote devices, the actuator configured to actuate in response to the command code.

12. The method of claim 8, further comprising sending at least one message via Manchester type encoding.

13. The method of claim 8, further comprising determining if an error exists in a packet of the at least one message.

14. A wireless communication device for use in a communication system to communicate command and sensed data between remote wireless communication devices, the wireless communication device comprising:
- a transceiver configured to send and receive wireless communications; and
- a controller configured to communicate with at least one other remote wireless device via the transceiver with a preformatted message, the controller further configured to format a message comprising a receiver address comprising a scalable address of at least one remote wireless device; a command indicator comprising a command code; a data value comprising a scalable message.

15. The wireless communication device of claim 14, further comprising at least one sensor configured to detect a condition and output a signal to the controller.

16. The wireless communication device of claim 14, wherein the controller is further configured to determine if at least one received message is a duplicate message and determine a location from which the duplicate message originated.

17. The wireless communication device of claim 14, further comprising at least one actuator configured to implement an action corresponding to the command code.

18. The device of claim 14, wherein the transceiver comprises a unique transceiver address to distinguish the transceiver from other transceivers.

19. In a system for communicating commands and sensed data between remote devices comprising a communications device for communicating commands and sensed data, the communications device comprising:
- a transceiver operatively configured to be in communication with at least one other of a plurality of transceivers, wherein the transceiver has a unique address, wherein the unique address identifies the individual transceiver, wherein the transceiver is geographically remote from the other of the plurality of transceivers, wherein each transceiver communicates with each of the other transceivers via preformatted messages;
- a controller configured to be in communication with the transceiver, the controller configured to provide preformatted messages for communication; wherein the preformatted messages comprises at least one packet, wherein the packet comprises: a receiver address comprising a scalable address of the at least one of the intended receiving transceivers; sender address comprising the unique address of the sending transceiver; a command indicator comprising a command code; at least one data value comprising a scalable message; and an error detector comprising a redundancy check error detector; and wherein the controller is configured to interact with the transceiver to send preformatted command messages.

20. The communications device of claim 19, further comprising a sensor operatively configured to detect a condition and output a sensed data signal that corresponds to the condition to the transceiver.

21. The communications device of claim 20, wherein the transceiver is configured to receive a preformatted command message requesting sensed data, confirms the receiver address as its own unique address, receives the sensed data signal, formats the sensed data signal into scalable byte segments, determines a number of segments required to contain the sensed data signal, and generates and transmits the preformatted response message comprising at least one packet.

22. In a system for controlling geographically diverse devices from a central location, a communications device comprising:
- means for dynamically sending and receiving messages, wherein the sent messages comprise commands and the received messages comprise responses to the commands, wherein the message comprises at least one means for packeting a message;
- a means for communicating information, the communicating means comprising: means for receiving messages; means for preparing responses to the received message; and means for sending the response message; wherein each communicating means has a unique identifying address;
- and wherein the packeting means comprises: means for identifying intended recipients; means for identifying a sender; means for indicating a command; means for data transfer; means for indicating potential error; means for indicating a byte length of a packet; means for indicating a total number of packets in a message; means for identifying a message; means for alerting a recipient to an incoming packet; and means for indicating an end of a packet.

23. The communications device of claim 21, wherein the means for communicating information is further configured to encode messages via Manchester encoding.

24. The communication device of claim 23, wherein the means for indicating potential error is configured to detect if an error exists in a packet or a number of packets of at least one message.

25. A wireless communication device for use in a communication system to communicate a number of commands and sensed data between remote wireless communication devices, the wireless communication device comprising:
- a transceiver configured to send and receive wireless communications; and
- a controller configured to communicate with at least one other remote wireless device via the transceiver with a preformatted message, the controller further configured to reformat a message comprising a receiver address comprising a scalable address of at least one remote wireless device; a command indicator comprising a command code; a data value comprising a scalable message.

* * * * *